US012024402B2

(12) United States Patent
Pratt, IV et al.

(10) Patent No.: US 12,024,402 B2
(45) **Date of Patent: *Jul. 2, 2024**

(54) STAIRLIFT OVERSPEED SAFETY SYSTEM

(71) Applicant: Harmar Mobility, LLC, Sarasota, FL (US)

(72) Inventors: Robert Alexander Pratt, IV, Kanasa City, MO (US); Derek J. Nash, Lakewood Ranch, FL (US); Mark L. Hill, Greenwood, MO (US); Mark Steven Jackson, Greenwood, MO (US)

(73) Assignee: Harmar Mobility, LLC, Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,129

(22) Filed: Mar. 9, 2023

(65) Prior Publication Data

US 2023/0356976 A1 Nov. 9, 2023

Related U.S. Application Data

(63) Continuation of application No. 16/952,763, filed on Nov. 19, 2020, now Pat. No. 11,603,287.

(51) Int. Cl.
*B66B 5/02* (2006.01)
*B66B 5/04* (2006.01)
*B66B 9/08* (2006.01)

(52) U.S. Cl.
CPC ................ *B66B 5/02* (2013.01); *B66B 5/044* (2013.01); *B66B 9/0807* (2013.01)

(58) Field of Classification Search
CPC ......... B66B 9/08; B66B 9/0807; B66B 5/044; B66B 5/02; B66B 5/22
See application file for complete search history.

(56) References Cited

U.S. PATENT DOCUMENTS 4,139,178 A 2/1979 Hippach
4,611,787 A 9/1986 May et al.
(Continued)

FOREIGN PATENT DOCUMENTS

CN 100500546 C 6/2009
CN 103080600 A 5/2013
(Continued)

OTHER PUBLICATIONS

Mar. 9, 2022—(WO) ISR and WO—App. No. PCT/US21/60180.
(Continued)

*Primary Examiner* — Diem M Tran
(74) *Attorney, Agent, or Firm* — Banner & Witcoff, Ltd.

(57) ABSTRACT

Systems, apparatuses, and methods are described for a stairlift overspeed safety system are disclosed. The overspeed safety system may include a centripetal cam assembly, a trigger assembly, and a jammer assembly. The centripetal cam assembly may include a spring-loaded plate and a plurality of centripetal cams connected to the spring-loaded plate, configured to move to an extended position when the rail speed exceeds the speed threshold. The trigger assembly may include a trigger plate configured to be pushed by at least one of the centripetal cams when moved to the extended position. Pushing the trigger plate may cause a switch to open to shut off power to the motorized stairlift. The jammer assembly may include a jammer configured to wedge between teeth of a rack and pinion of the motorized stairlift to initiate a deceleration to stop movement of the motorized stairlift.

18 Claims, 15 Drawing Sheets

(56) References Cited

U.S. PATENT DOCUMENTS

| | | | | |
|---|---|---|---|---|
| 6,997,090 | B2 | 2/2006 | Gass et al. | |
| 8,087,495 | B2 | 1/2012 | Szentistvany | |
| 10,053,334 | B1 * | 8/2018 | Cheng | F16D 63/006 |
| 2017/0144860 | A1 * | 5/2017 | Colenutt | B66B 5/044 |

FOREIGN PATENT DOCUMENTS

| | | | | |
|---|---|---|---|---|
| WO | 9422756 | A1 | 10/1994 | |
| WO | 9709264 | A1 | 3/1997 | |
| WO | 2004014773 | A1 | 2/2004 | |
| WO | WO-2004014773 | A1 * | 2/2004 | B66B 9/0815 |
| WO | 2010142973 | A1 | 12/2010 | |
| WO | WO-2010142973 | A1 * | 12/2010 | B66B 9/08 |
| WO | 2015193646 | A1 | 12/2015 | |
| WO | 2016170038 | A1 | 10/2016 | |

OTHER PUBLICATIONS

Apr. 22, 2022—(US) Office Action—U.S. Appl. No. 16/952,763.
Nov. 10, 2022—(US) Notice of Allowance—U.S. Appl. No. 16/952,763.

* cited by examiner

STAIRLIFT OVERSPEED SAFETY SYSTEM

CROSS-REFERENCE TO RELATED APPLICATIONS

This patent application is a continuation of pending U.S. patent application Ser. No. 16/952,763 filed Nov. 19, 2020, entitled Stairlift Overspeed Safety Systems of which is incorporated herein by reference in its entirety.

TECHNICAL FIELD

Aspects of the present disclosure generally relate to processes, systems, and apparatuses for stairlift systems, and more particularly to overspeed safety mechanisms for motorized stairlift systems.

BACKGROUND

Mobility-impaired individuals frequently use mobility assistance devices such as, for example, power chairs, scooters, or wheelchairs to aid in transportation. While these mobility assistance devices may provide greatly increased mobility over uniform surfaces, they may not be effective on non-uniform surfaces, such as, for example, stairs. Motorized stairlifts, e.g., with a carriage or chair mounted for movement along a rail that extends up a stairway, may provide users of mobility assistance devices a method of navigating stairways. Motorized stairlift typically include overspeed governors or overspeed safety systems that apply a braking force in the event that a component failure or other malfunction allows the carriage to exceed a predetermined speed while moving down the rail.

Known overspeed governors are often complex in form, employing complicated electrical and mechanical components. Additionally, many overspeed systems harshly apply a braking force that jerk the carriage to a stop, or may allow the carriage to travel a substantial distance down the rail before being brought to a stop. Known overspeed governors with simple structures may be predisposed to imprecise operation (e.g., being unnecessarily activated or not be activated as needed); while those with complicated structures take up too much space while in operation and add significant cost to the stairlift system. Additionally, regulatory codes may specify a maximum stop distance of safety braking and/or that actuation devices of the overspeed governor not include electrical components.

SUMMARY

The following presents a simplified summary of the present disclosure in order to provide a basic understanding of example aspects described herein. This summary is not an extensive overview, and is not intended to identify key or critical elements or to delineate the scope of the claims. The following summary merely presents various described aspects in a simplified form as a prelude to the more detailed description provided below.

Aspects of the disclosure provide technical solutions that overcome one or more of the technical problems described above and/or other technical challenges. For instance, one or more aspects of the disclosure relate to systems, methods, and apparatuses are described for a stairlift overspeed safety system. The overspeed safety system may include a centripetal cam assembly, a trigger assembly, and a jammer assembly. The centripetal cam assembly may include a plurality of centripetal cams linked together and configured to move to an extended position when the rail speed exceeds the speed threshold. The trigger assembly may include a trigger plate configured to be pushed by at least one of the centripetal cams when moved to the extended position. Pushing the trigger plate may cause a switch to open to shut off power to the motorized stairlift. The jammer assembly may include a jammer configured to wedge between teeth of a rack and pinion of the motorized stairlift to initiate a deceleration to stop movement of the motorized stairlift.

In accordance with one or more embodiments, an overspeed safety apparatus for a motorized stairlift may include a centripetal cam assembly and a trigger assembly. The centripetal cam assembly may include a spring-loaded linkage plate and a plurality of centripetal cams connected to the spring-loaded linkage plate. The spring-loaded linkage plate may be configured to hold the plurality of centripetal cams in a collapsed position when the stairlift operates at a rail speed below a speed threshold. The plurality of centripetal cams may be configured to move to an extended position when the rail speed exceeds the speed threshold. The trigger assembly may be operably connected to the centripetal cam assembly and may be configured to be impacted by at least one of the plurality of centripetal cams, when the plurality of centripetal cams move to the extended position, so as to cause a switch to open to shut off motor power to the motorized stairlift.

In some embodiments, the trigger assembly may include a trigger plate. At least one of the plurality of centripetal cams, when moved to the extended position, may then be configured to push the trigger plate to open the switch.

In some embodiments, the motorized stairlift may include a curved stairlift with a dual rail system. The centripetal cam assembly may then be mounted to an upper roller of the dual rail system.

In some embodiments, the plurality of centripetal cams may include one or more pairs of centripetal cams. In such embodiments, for each of the one or more pairs of centripetal cams, a first cam may be positioned directly across a second cam along a centerline of the spring-loaded plate, so as to cancel out gravitational effects. In some examples, the plurality of centripetal cams may include four centripetal cams radially spaced around the spring-loaded plate. In some examples, the plurality of centripetal cams may be configured to move from the collapsed position to the extended position by converting translational motion of the motorized stairlift to centripetal motion around the spring-loaded plate as the rail speed exceeds the speed threshold.

In some embodiments, the trigger assembly may include a trigger plate configured to push open the switch when impacted by at least one of the plurality of centripetal cams when the centripetal cam assembly moves to the extended position, and an over-center spring configured to retain the trigger plate in an operational position with the switch closed while the centripetal cam assembly remains in a collapsed position. The over-center spring may be further configured to rotate the trigger plate upon at least one of the plurality of centripetal cams pushing the trigger plate when the centripetal cam assembly moves to the extended position. Rotating the trigger plate may cause the switch to open. The over-center spring may be configured to retain the trigger plate in a first location while in the operational position, and to retain the trigger plate in a second location after being pushed to hold open the switch. In some examples, the trigger assembly may be mounted to a structure holding a roller assembly of the motorized stairlift.

In some embodiments, the overspeed safety apparatus may further include a jammer assembly operably connected to the trigger assembly. The jammer assembly may include a jammer. Impacting the trigger assembly may cause the jammer to wedge between teeth of a rack and pinion of the motorized stairlift to initiate a deceleration and stop movement of the motorized stairlift. In some aspects, the overspeed safety apparatus may further include a Bowden cable flexibly connecting the trigger assembly to the jammer assembly. The trigger assembly may pull the Bowden cable when impacted by at least one of the plurality of centripetal cams.

In some aspects, the jammer assembly may include a retainer plate configured to retain the jammer in place in an operational position and, upon the trigger assembly being impacted by at least one of the plurality of centripetal cams, to be actuated so as to release the jammer. The jammer may be spring loaded into a jammer compartment of the jammer assembly and may be retained in the jammer compartment by the retainer plate in the operational position. In some aspects, movement of the trigger assembly upon being impacted by at least one of the plurality of centripetal cams may cause a cable to pull the retainer plate so as to release the jammer spring-loaded in the jammer compartment. The jammer may be formed of a compliant plastic (e.g., polypropylene) material shaped progressively thicker from a first end to a second end.

In some examples, a stop distance of the motorized stairlift between the rail speed exceeding the speed threshold and the motorized stairlift coming to a stop is less than 6 inches. In some examples, the motorized stairlift may be configured to operate at an incline between 0 degrees and 60 degrees.

In accordance with one or more embodiments, a method of controlling a motorized stairlift with an overspeed safety apparatus is provided. The method may include actuating a plurality of centripetal cams connected to a spring-loaded plate when the stairlift operates at a rail speed exceeding a speed threshold, pushing, by at least one of the plurality of centripetal cams being actuated, a trigger plate, and opening, by the trigger plate being pushed, a switch to shut off motor power to the motorized stairlift.

In some embodiments, actuating the plurality of centripetal cams may include converting translation motion of the motorized stairlift to centripetal motion around the spring-loaded plate as the rail speed exceeds the speed threshold.

In accordance with one or more embodiments, an overspeed safety apparatus for a motorized stairlift is provided. The motorized stairlift may include a stairlift rail, a carriage configured to be driven along the motorized stairlift by a rack and pinion system, and a motor configured to power movement of the carriage along the stairlift rail. The overspeed safety apparatus may include a jammer assembly with a jammer configured to be released upon a rail speed of the stairlift rail exceeding a speed threshold. Releasing the jammer may cause the jammer to wedge between teeth of the rack and pinion system to initiate a deceleration to stop movement of the motorized stairlift.

In some embodiments, the jammer assembly may further include a retainer plate configured to retain the jammer in place in an operational position and, upon the rail speed of the stairlift rail exceeding the speed threshold, to be actuated so as to release the jammer. The jammer may be spring loaded into a jammer compartment of the jammer assembly and is retained in the jammer compartment by the retainer plate when in the operational position. In some examples, the overspeed safety apparatus may further include a cable configured to pull the retainer plate upon the rail speed of the stairlift rail exceeding the speed threshold so as to release the jammer spring-loaded in the jammer compartment.

In some examples, the jammer may be formed of a compliant material (e.g., plastic or polypropylene material). The jammer may have a wedge shape with an increasing thickness from a first end to a second end. In some examples, the jammer may be configured to shear and deform upon being wedged into the teeth of the rack and pinion to control a rate of deceleration of the motorized stairlift upon the motor being shut off.

In accordance with one or more embodiments, a method of actuating an overspeed safety system for a motorized stairlift is provided. The method may include mechanically actuating a trigger so as to open a switch to shut off motor power to the motorized stairlift, upon the trigger being actuated, releasing a jammer from a jammer compartment, and wedging the jammer between teeth of a rack and pinion of the motorized stairlift to initiate a deceleration to stop movement of the motorized stairlift.

In some embodiments, releasing the jammer includes moving a retainer plate so as to release the jammer spring-loaded in the jammer compartment. Wedging the jammer may include shearing and deforming the jammer upon being wedged into the teeth of the rack and pinion to control the deceleration rate of the motorized stairlift upon the motor being shut off. Mechanically actuating the trigger may include moving a plurality of centripetal cams connected to a spring-loaded plate from a collapsed position to an extended position when the stairlift operates at a rail speed exceeding the speed threshold. In some examples, the method may further include pushing at least one of the plurality of centripetal cams into a trigger plate upon the plurality of centripetal cams moving to the extended position, and causing, by movement of the trigger plate being pushed, the switch to open to shut off motor power to the motorized stairlift.

In accordance with one or more embodiments, a motorized stairlift includes a stairlift rail including rail sections that, when installed, are arranged at different angles to a horizontal plane, a carriage mounted on the stairlift rail for movement along the stairlift rail by a rack and pinion system, a motor configured to power movement of the carriage along the stairlift rail, and an overspeed apparatus configured to shut off the motor and to stop movement of the carriage along the stairlift rail when a speed of the stairlift rail exceeds a speed threshold. The overspeed apparatus may include a jammer assembly with a jammer configured to be released upon the speed of the stairlift rail exceeding a speed threshold. Releasing the jammer may then cause the jammer to wedge between teeth of the rack and pinion system to initiate a deceleration to stop movement of the motorized stairlift.

In some embodiments, the overspeed apparatus may further include a trigger assembly operably connected to the jammer assembly and configured to impact the jammer assembly to release the jammer.

In some embodiments, the jammer assembly may further include a retainer plate configured to retain the jammer in place in an operational position and, upon the speed of the stairlift rail exceeding a speed threshold, to be actuated so as to release the jammer. The jammer may be spring loaded into a jammer compartment of the jammer assembly and may be retained in the jammer compartment by the retainer plate when in the operational position.

In some embodiments, the stairlift rail, when installed, may form a stairlift with an incline that may vary between 0 degrees and 60 degrees. The stairlift rail may include a dual rail system with an upper roller and a lower roller, and at least a portion of the overspeed apparatus may be mounted to an upper roller of the dual rail system. A stop distance, defined by a distance that the carriage moves between a point at which the rail speed exceeds the speed threshold and a point at which the carriage comes to a stop, may be less than 6 inches. In some examples, the jammer may include a plastic material formed of a wedge shape.

The summary here is not an exhaustive listing of the novel features described herein, and are not limiting of the claims. These and other features are described in greater detail below.

BRIEF DESCRIPTION OF THE DRAWINGS

Some features herein are illustrated by way of example, and not by way of limitation, in the accompanying drawings. In the drawings, like numerals reference similar elements between the drawings.

Figure 1A:
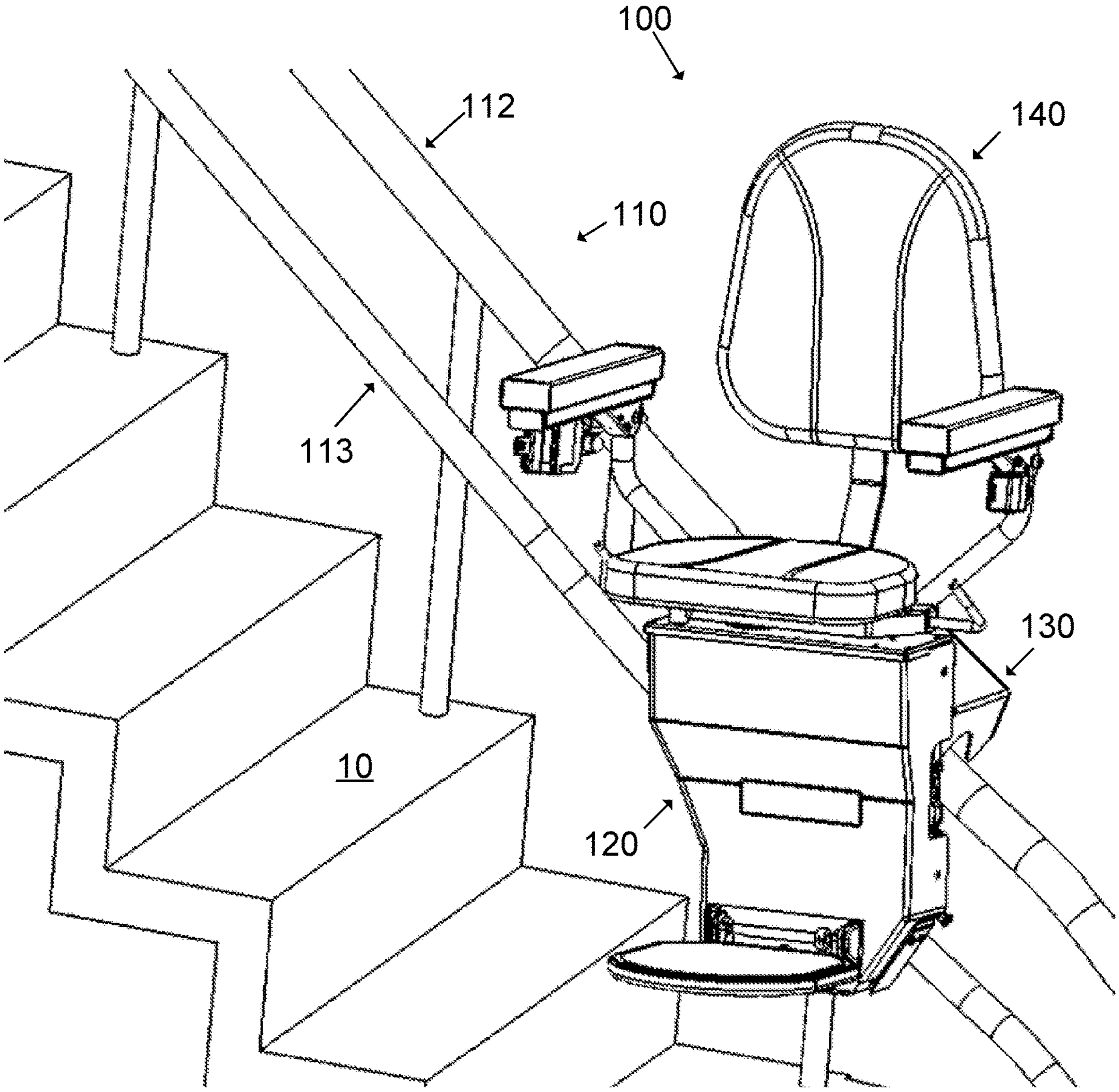
FIGS. 1A-1C show a motorized stairlift in accordance with one or aspects of the present disclosure.

The drawing figures do not limit the present disclosure to the specific embodiments disclosed and described herein. The drawings are not necessarily to scale, emphasis instead being placed upon clearly illustrating the various aspects of the present disclosure.

DETAILED DESCRIPTION

In the following description, reference is made to the accompanying drawings, which form a part hereof, and in which are shown various examples of how the disclosure may be practiced. Other examples may be utilized, and structural or functional modification may be made, without departing from the scope of the present disclosure.

Motorized stairlifts may provide benefits to individuals who require mobility assistance. The installation of a motorized stairlift may greatly increase mobility for those who use mobility assistance devices or otherwise have difficulty navigating stairs and other non-uniform surfaces. Motorized stairlifts may transport individuals or even certain items up and down stairways or other inclined surfaces.

As shown in FIG. 1A, an example motorized stairlift 100 is depicted in accordance with one or aspects of the present disclosure. The stairlift 100 may include a track 110, a carriage 120, and a drive mechanism 130. The stairlift 100 may also include conventional controls, safety features, and other components not described in detail herein. The track 110 may be configured to be mounted along a stairway 10 or other area to be traversed by the carriage 120 and is similar to tracks of conventional stairlifts.

The carriage 120 may be supported on the track 110 and may support a chair 140, bench, or other support on which a person sits. The carriage 120 and chair 140 move up and down the track 110 under power of the drive mechanism 130. The carriage 120 may enclose and/or support one or more drive mechanism components, controls, safety mechanisms, and other supporting systems of the stairlift.

Figure 1B:
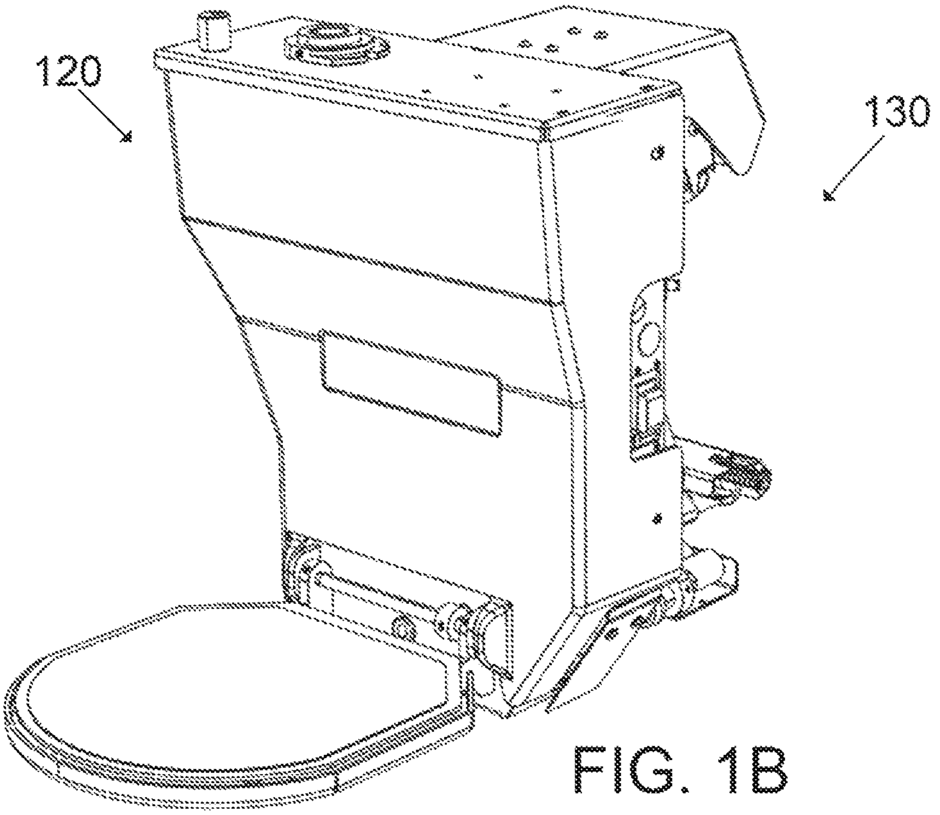
Figure 1C:
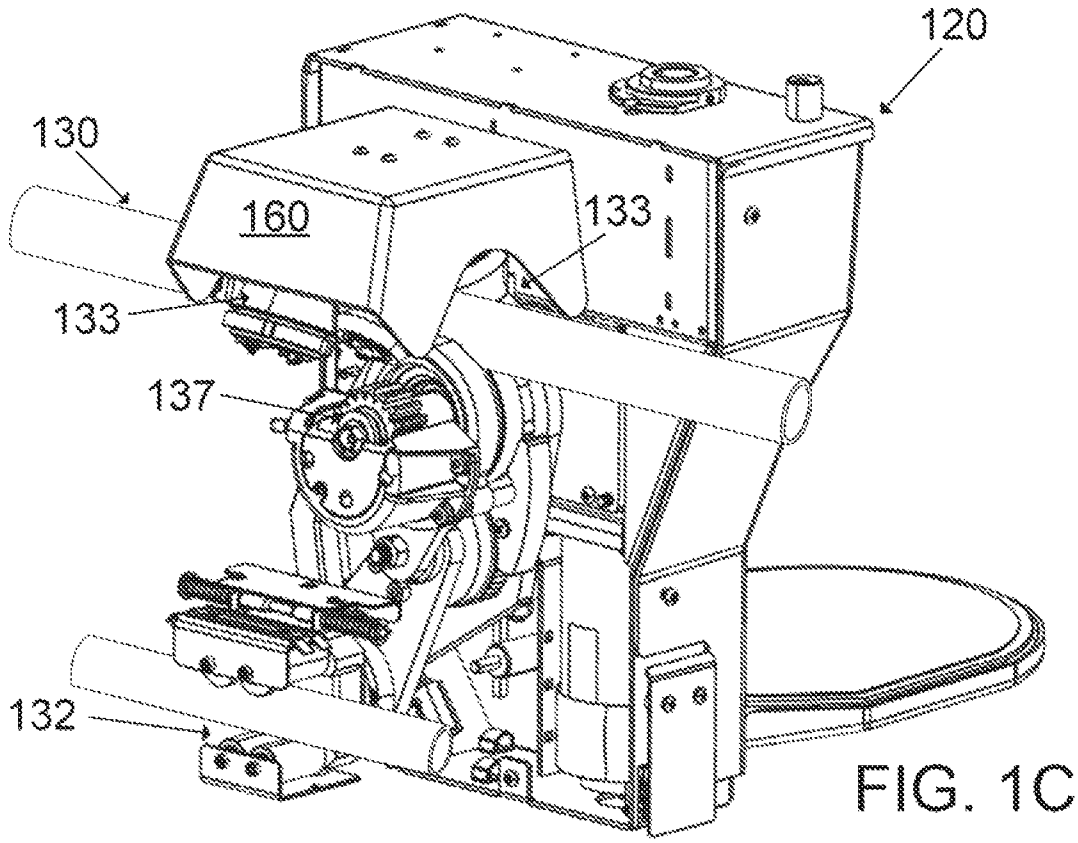

The drive mechanism 130 may be coupled with the track 110 and the carriage 120 for moving the carriage 120 along the track, up or down the stairway. The drive mechanism 130 may include a motor-driven belt system, rack and pinion system, chain system, worm gear system, or any other known drive mechanism. The drive mechanism 130, when coupled to the track 110, may keep the carriage 120 level. As shown in FIG. 1C, the drive mechanism 130 may include a rack and pinion system 135 extending from a rear side of the carriage 120. A pinion 137 of the rack and pinion system 135 may be mounted to a support plate that is in turn mounted to the carriage 120. A motor may drive the rack and pinion system 135. The drive mechanism 130 may also include two pairs of upper rollers 133 that ride along the upper rail of the track 110 and two pairs of lower rollers 132 that ride along the lower rail and keep the carriage 120 plumb on the track 110 and keep the carriage 120 level as it moves along the track 110. The distance between the upper and lower rails may change with a changing incline of the upper rail. FIG. 1C shows the drive mechanism 130 in a generally horizontal position.

As shown in FIG. 1A, the stairlift 100 may be mounted on the side of the stairway 10, or may be mounted on a sidewall or a separate frame structure. The track 110 may be any length and constructed of any suitable materials. The track 110 may include a main track section that spans the entire stairway, or the most of stairway, e.g., except for the bottommost stair and/or topmost stair. The track 110 may include one or more fixed parts and one or more moveable parts (e.g., where moveable parts include an assembly with drive mechanism 130 and carriage 120, as shown in FIGS. 1B and 1C). The one or more fixed parts may include a first guide rail 112 and a second guide rail 113. The guide rails 112, 113 may be mounted in parallel with one above the other. One or both of the guide rails 112, 113 may form a profile to function as a banister for the stairway or may follow the contour of an existing banister.

Figure 2:
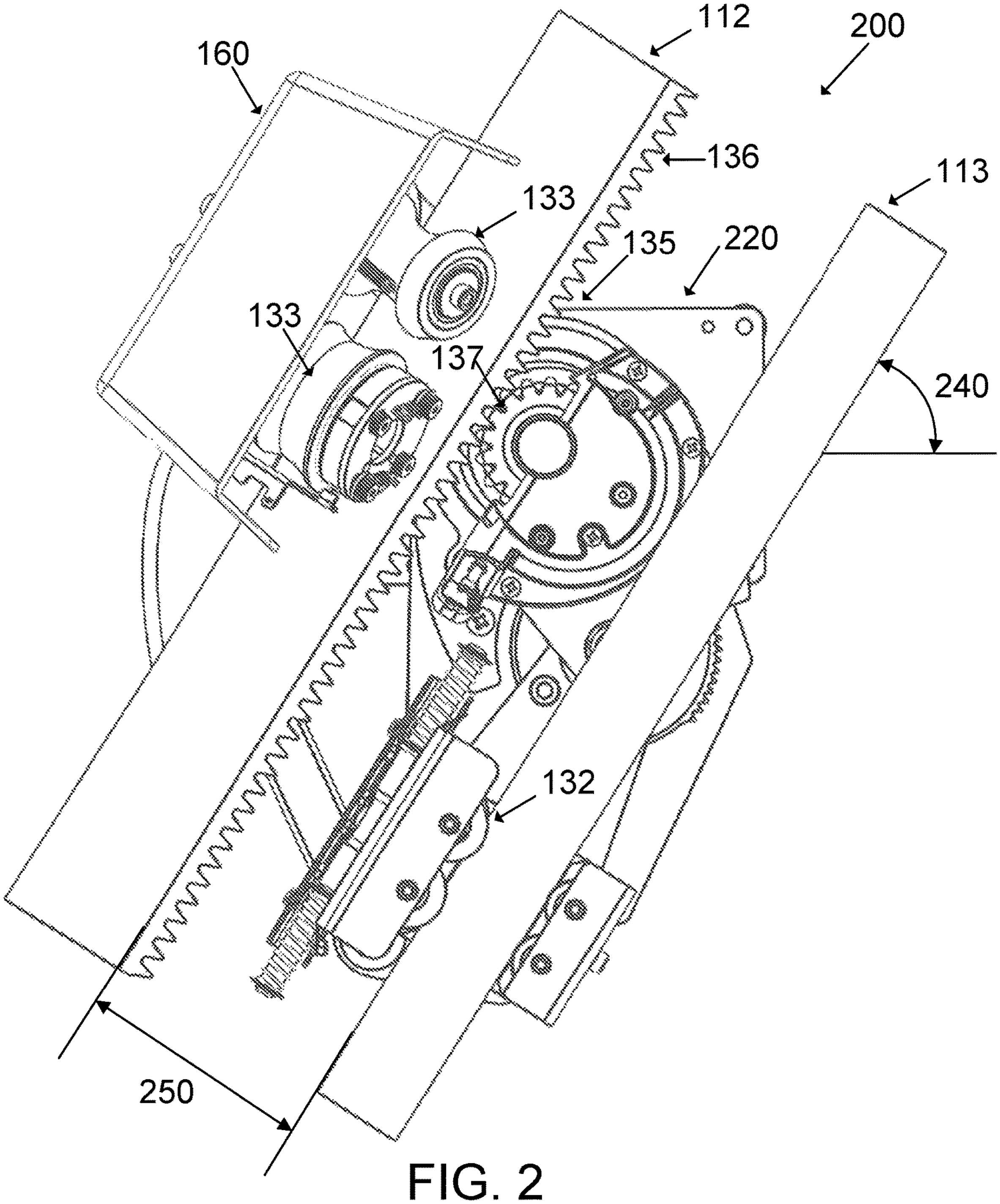
FIG. 2 shows portions of a motorized stairlift mechanism in accordance with one or aspects of the present disclosure.

As shown in the FIG. 1A, the guide rails 112, 113 follow the stairway 10 as the stairway 10 changes direction, which may result in bent or curved portions of each of the guide rails 112, 113. Curved portions in the guide rails may be a result of a change in slope of the staircase and/or a change in direction, and thus the curvature may be in a horizontal direction or a vertical direction or both. As shown in FIG. 2, the first guide rail 112 (e.g., an upper guide rail) may be provided with a rack 136 for a geared engagement with drive mechanism 130 of the carriage 120, for movement of the carriage 120 along the guide rails 112, 113. The second guide rail 113 may function as a support for the carriage 120 as it moves along the guide rails 112, 113. Additionally or as an alternative to the second rail 113 (e.g., a lower guide rail), the carriage 120 may be provided with a stabilizing mechanism for keeping the carriage 120 in a suitable vertical/horizontal orientation (e.g., so that the chair 140 is kept in a horizontal orientation). The carriage 120 may include a receiver that supports a chair 140 for accommodating a person.

The drive mechanism 130 may include a motor for driving one or more pinions 137 of a rack and pinion system 135 through one or more gear boxes associated with the first guide rail 112 and/or the second guide rail 113. In some configurations, two rack and pinion systems may be employed, with one to drive the carriage and the other to keep the carriage level. In some configurations, a rack and pinion system may be used to drive the carriage and a motor with an accelerometer drive may be used to keep the carriage level. A switch may be provided to cut off power to the motor when in an open (e.g., non-contacting) position. The motor may drive gear boxes for each of the guide rails 112, 113, which may be provided with the same or similar transmission ratios and may be driven by the same drive axis so that the stairlift 100 is not tilted during operation. A pinion 137 may engage a rack 136 of the rack and pinion system 135, shown in FIG. 1 on a lower section of the first guide rail 112. The pinion 137 may be provided with teeth shaped to engage with the rack 136. The rack 136 may extend along a portion, e.g., an underside, of the first guide rail 112. The carriage 120 may be mounted to a portion of the drive mechanism 130. In this regard, the carriage 120 may be driven along the first guide rail 112 by the rack and pinion system 135, e.g., as the pinion 137 is driven by the motor.

Precise control of movement of the carriage 120 along track 110 may be important for various reasons, particularly in the case of curved stairlifts. In some examples, the speed of the carriage 120 along the track 110 may be controlled within predetermined limits. Further, as the carriage 120 traverses transition curves or bends in the track 110, the chair 140 may be maintained in a general horizontal orientation with minimal variance.

Figure 3:
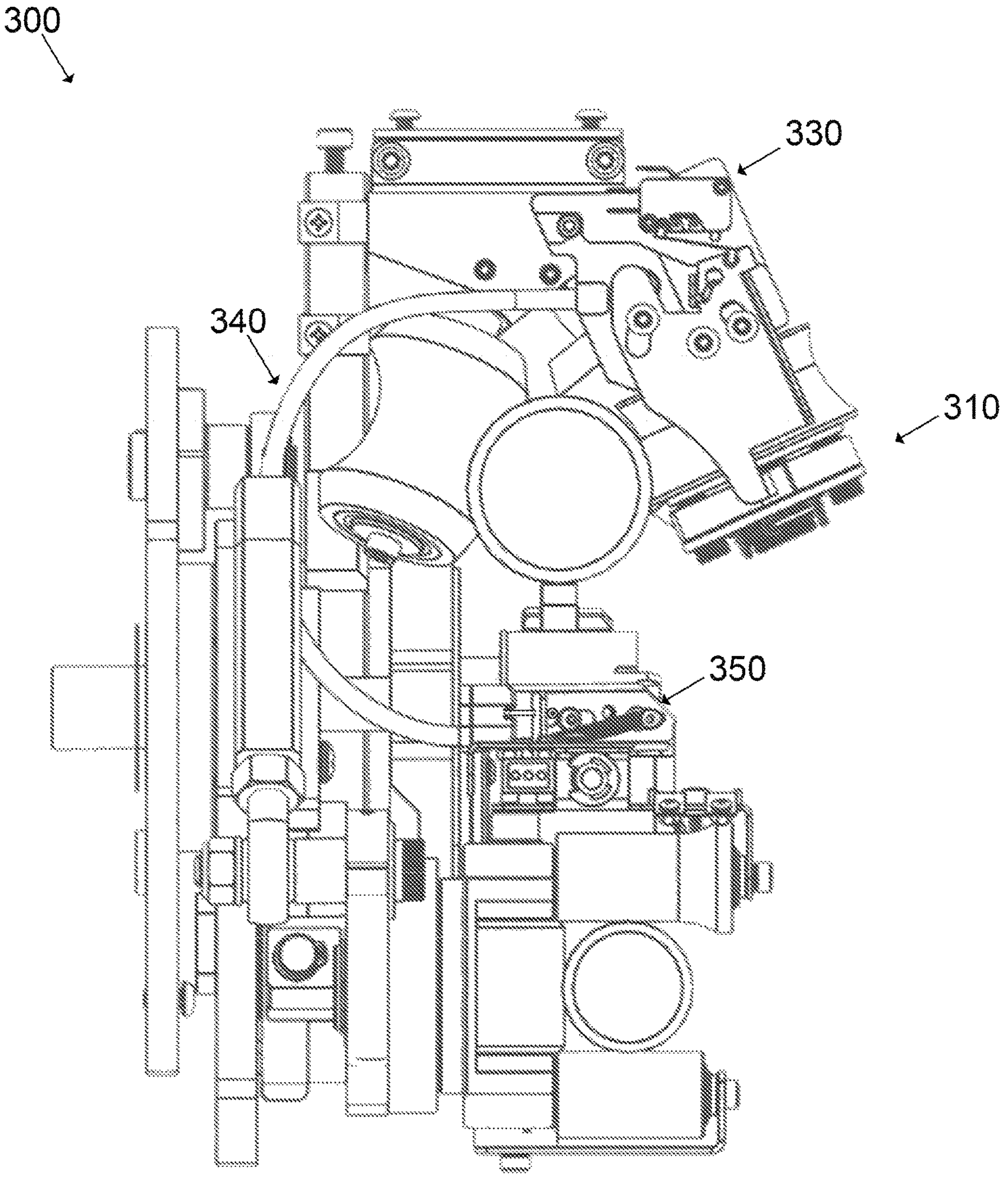
FIG. 3 shows a portion of a motorized stairlift mechanism in accordance with one or aspects of the present disclosure.

As shown in FIG. 3, an overspeed safety mechanism 300 is provided with the stairlift. Certain regulations may specify that stairlifts include a device which prevent the carriage from moving above a speed threshold. In this regard, the overspeed safety mechanism 300 may be mounted to the carriage 120 and may, in the event the carriage 120 exceeds a speed threshold, stop the carriage 120 from further movement.

As shown in FIG. 2, the overspeed safety mechanism 300 may be implemented in a curved stairlift leveling mechanism 200 for a motorized stairlift. The stairlift may be configured to follow stairs at an incline between 0 degrees and 60 degrees. The stairlift may include a carriage (or chassis) and a chair mounted to the carriage. The carriage and chair system may stay level by a rail-to-rail distance of the stairlift changing (e.g., where smallest rail-to-rail distance corresponds to a stair incline of 60 degrees and a largest rail-to-rail distance corresponds to a stair incline of 0 degrees). In some instances a nominal speed of the stairlift may be on the order of 25-30 feet per minute.

As shown in FIG. 2, a stairlift leveling mechanism 200 may be provided with a stairlift to maintain a level orientation of the carriage 120, e.g., regardless of the incline angle of the stairlift. In some examples, the level mechanism 200 may function to prevent the carriage 120 from going off-level past a preset threshold. The level mechanism 200 may be programmed to maintain an orientation of the chair 140 within the preset threshold.

FIG. 2 shows portions of a stairlift leveling mechanism 200 in accordance with one or aspects of the present disclosure. As shown in FIG. 2, a stairlift leveling mechanism 200 for a curved stairlift is shown, along with a top rail 112 and a bottom rail 113 of the track 110. The top and bottom rails 112, 113 may be configured to follow stairs that vary in angle from zero degrees (e.g., flat, horizontal) to 60 degrees. A carriage mount 220 may be configured to mount a carriage or carriage and chair assembly (e.g., similar to carriage 120 and chair 140 of FIG. 1). The carriage mount 220 may stay level by a rail-to-rail distance 250 (the distance between the top rail 112 and the bottom rail 113) changing as an incline angle 240 of the stairway changes. Accordingly, a smallest rail-to-rail distance may correspond to a largest incline angle (e.g., 60 degrees), while a largest rail-to-rail distance may correspond to a smallest incline angle (e.g., 0 degrees). FIG. 2 also shows a cover 160 of an upper roller assembly, which may also include portions of an overspeed safety mechanism 300, as will be described in greater detail below.

Figure 4:
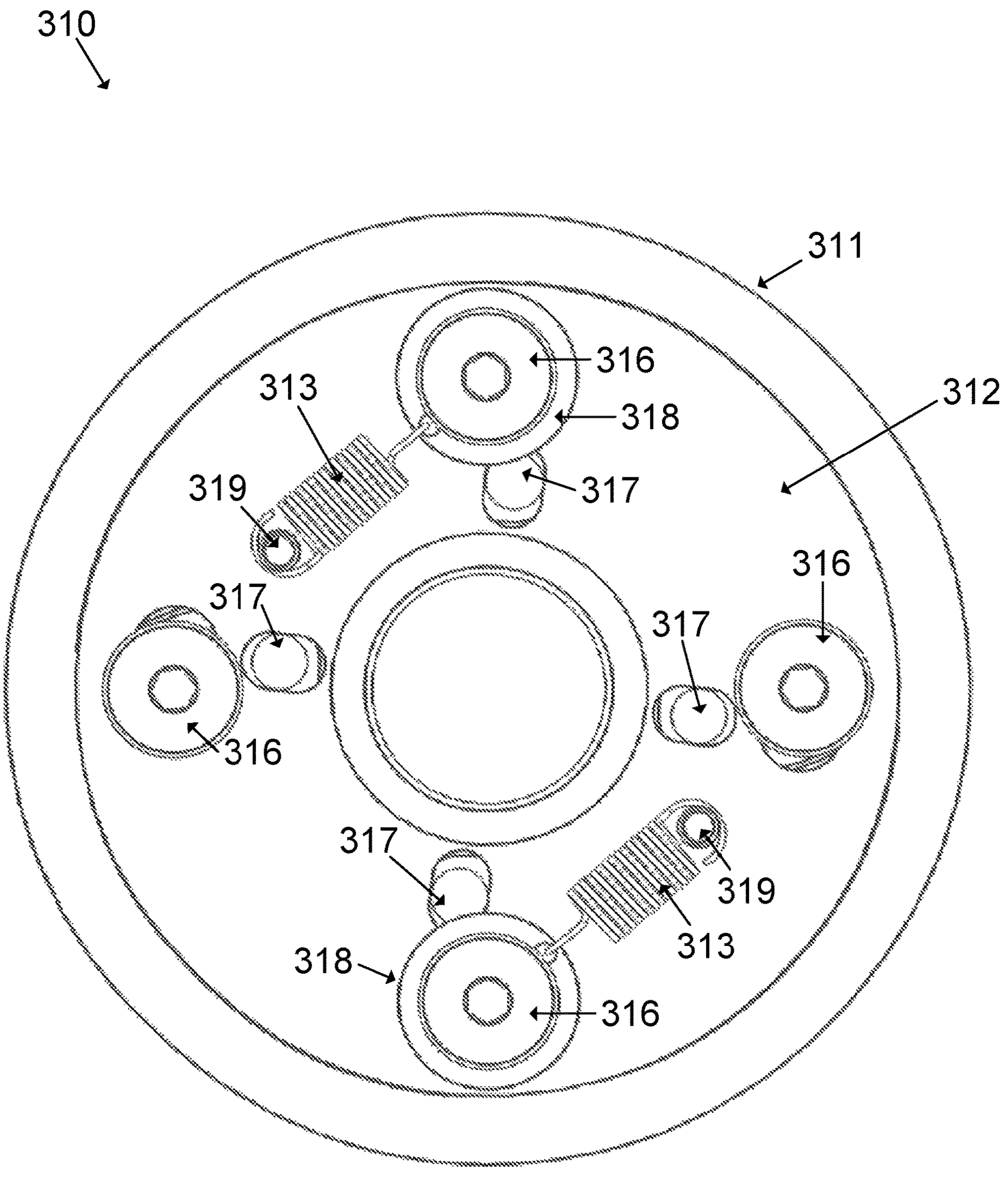
FIG. 4 shows a top view of a centripetal cam assembly for an overspeed safety mechanism in accordance with one or more aspects of the present disclosure.
Figure 5A:
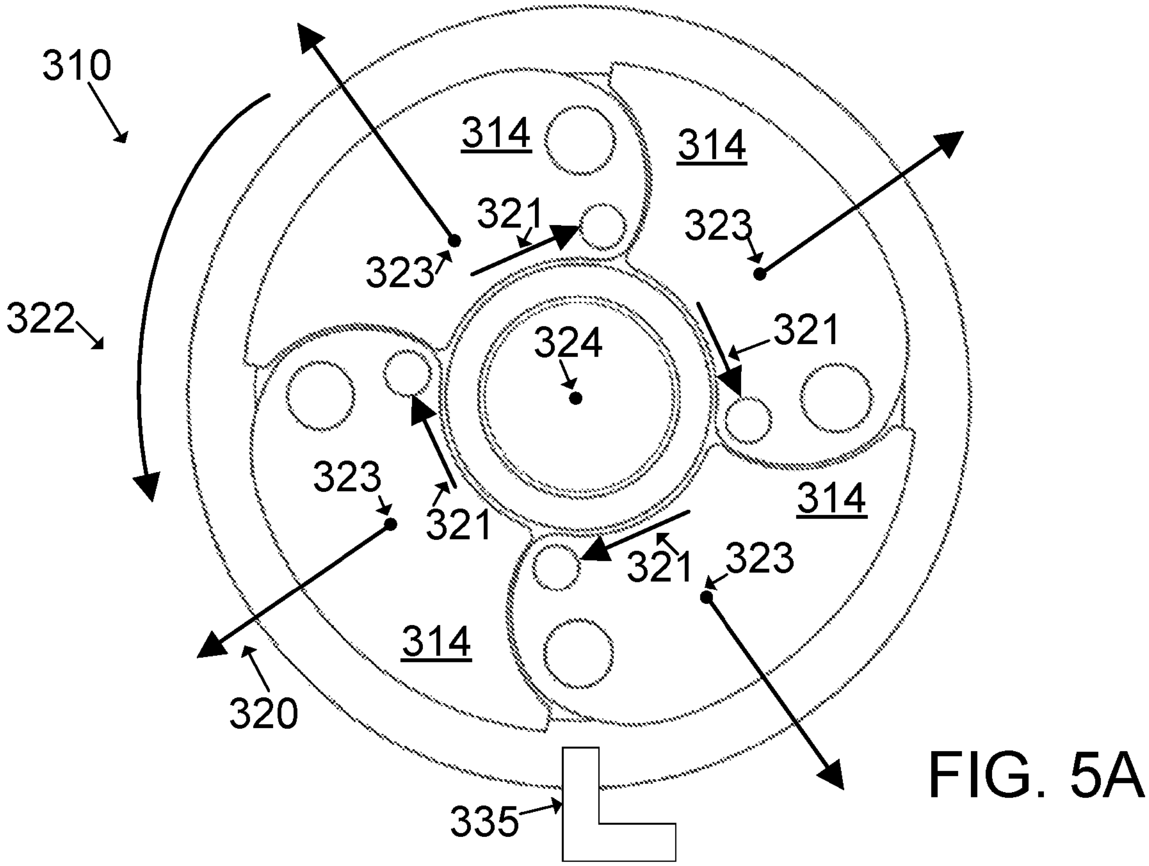
FIGS. 5A and 5B show schematic views of portions of a centripetal cam assembly for an overspeed safety mechanism in a collapsed position and an extended position, respectively, in accordance with one or more aspects of the present disclosure.
Figure 5B:
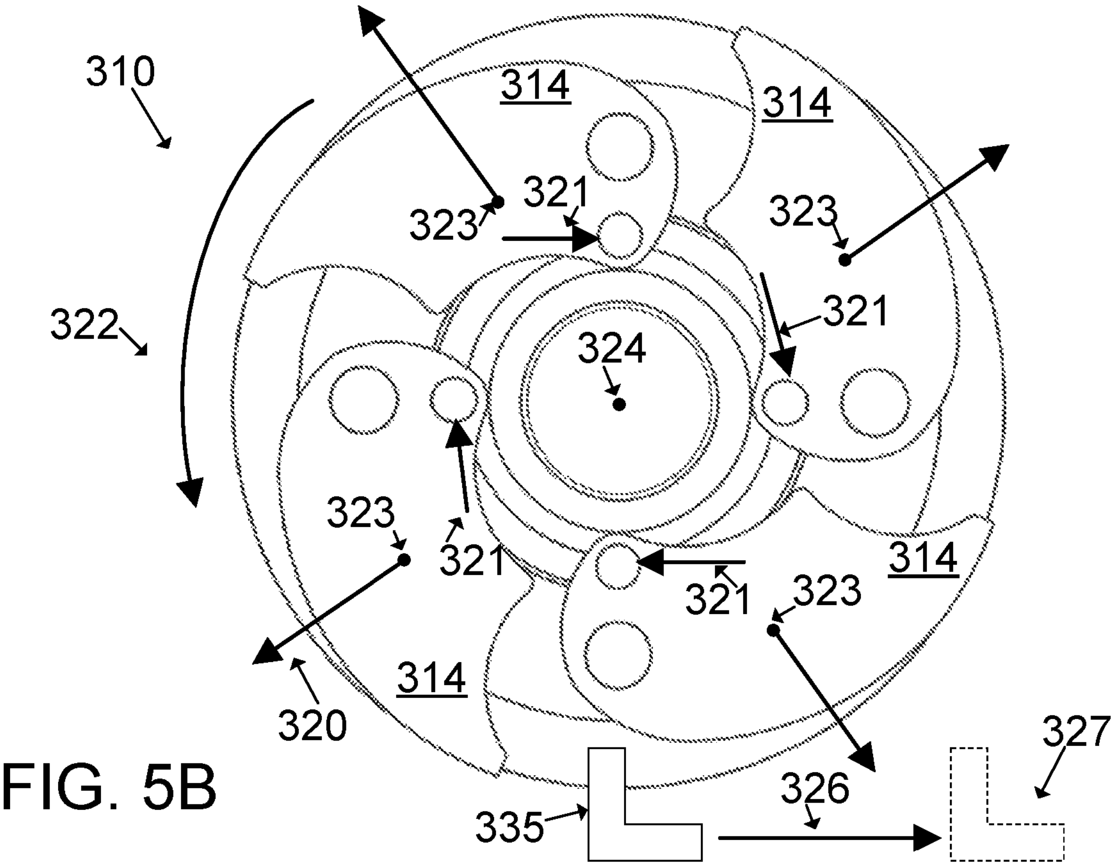

FIG. 3 shows a portion of an overspeed safety mechanism 300, with a cover 160 of the upper roller assembly removed, and viewing up from the top rail 112 and bottom rail 113. The overspeed safety mechanism 300 may include a centripetal cam assembly 310, a trigger assembly 330, and a jammer assembly 350. The centripetal cam assembly 310 may be mounted to a roller in the upper roller assembly. As shown in the view of FIG. 3, the trigger assembly 330 is positioned proximate to the centripetal cam assembly 310, and a Bowden cable 340 connects the trigger assembly 330 to the jammer assembly Now referring to FIG. 4, a top view of the centripetal cam assembly 310 for an overspeed safety mechanism is shown in accordance with one or more aspects of the present disclosure. The centripetal cam assembly 310 may include a roller 311 (e.g., one of the pair of rollers 133 shown in FIGS. 1C and 2), a spring-loaded cam plate 312 and a plurality of centripetal cams 314 (not shown in the view of FIG. 4). As shown in FIGS. 5A and 5B, the centripetal cam assembly 310 may include four centripetal cams 314 tied together with the spring-loaded cam plate 312. In some examples, the centripetal cams 314 may be linked together in the centripetal cam assembly 310, e.g., with a linkage such as a linkage plate, cam plate, or other suitable device. The spring-loaded cam plate 312 may include a plurality of extension springs 313, that create a rotational load (e.g., a clockwise load in the embodiment depicted in FIG. 4) on the spring-loaded cam plate 312 by connecting posts 319 on the cam plate 312 with washers 318 on the shoulder bolts 316. The spring-loaded cam plate 312 may be mounted to the roller 311. The centripetal cam assembly 310 may include a plurality of shoulder bolts 316, such that the spring-loaded cam plate 312 may rotate within slots for the shoulder bolts 316. Dowel pins 317 may be pressed into the centripetal cams 314 such that a load is applied to the dowel pins 317 by the spring-loaded cam plate 312.

The extension springs 313 may be configured to hold the centripetal cams 314 in a collapsed position until a rotational speed of the roller exceeds a set value, e.g., a speed threshold. FIGS. 5A and 5B show schematic views of portions of the centripetal cam assembly 310, in which the spring-loaded cam plate 312 is removed, thus exposing the plurality of centripetal cams 314, showing the collapsed position and the extended position, respectively. Centripetal forces 320 on the centripetal cams 314 may occur as the roller rotates in a rotational direction 322 (counterclockwise in the examples shown in FIGS. 5A and 5B). Centripetal forces 320 act at the center of gravity 323 of the centripetal cams 314 and act in an outward direction, relative to a centerline 324 of the centripetal cam assembly 310. The centripetal forces 320 on each of the centripetal cams 314 may be calculated according to the following formula:

$$F_c = \frac{mv^2}{r}$$

In the above formula, $F_c$ represents the centripetal force 320 acting on each of the centripetal cams 314, m represents the mass of a centripetal cam 314 (in pounds), r represents a radial distance (in feet) from the centerline 324 to the center of gravity 323 of the centripetal cam 314, and v represents the angular velocity, which may be calculated according to the following formula:

$$V = \frac{2\pi\theta r}{60}$$

In the above formula, θ represents the angular velocity (in revolutions per minute) and r represents a radial distance (in feet). Spring forces 321 from the extension springs 313 are sufficient to hold the centripetal cams 314 in the collapsed position (e.g., as shown in FIG. 5A) at rotational speeds below the set value (and when the roller is at rest). In other words, at rotational speeds below the set value, the spring forces 321 are sufficient to counteract the centripetal forces 320, and this keep the centripetal cams 314 in the collapsed position. Thus, based on the known force of the spring, a speed threshold (in revolutions per minute) may be calculated. This speed threshold may thus represent a threshold at which the centripetal cams 314 remain in the collapsed position.

Figure 6A:
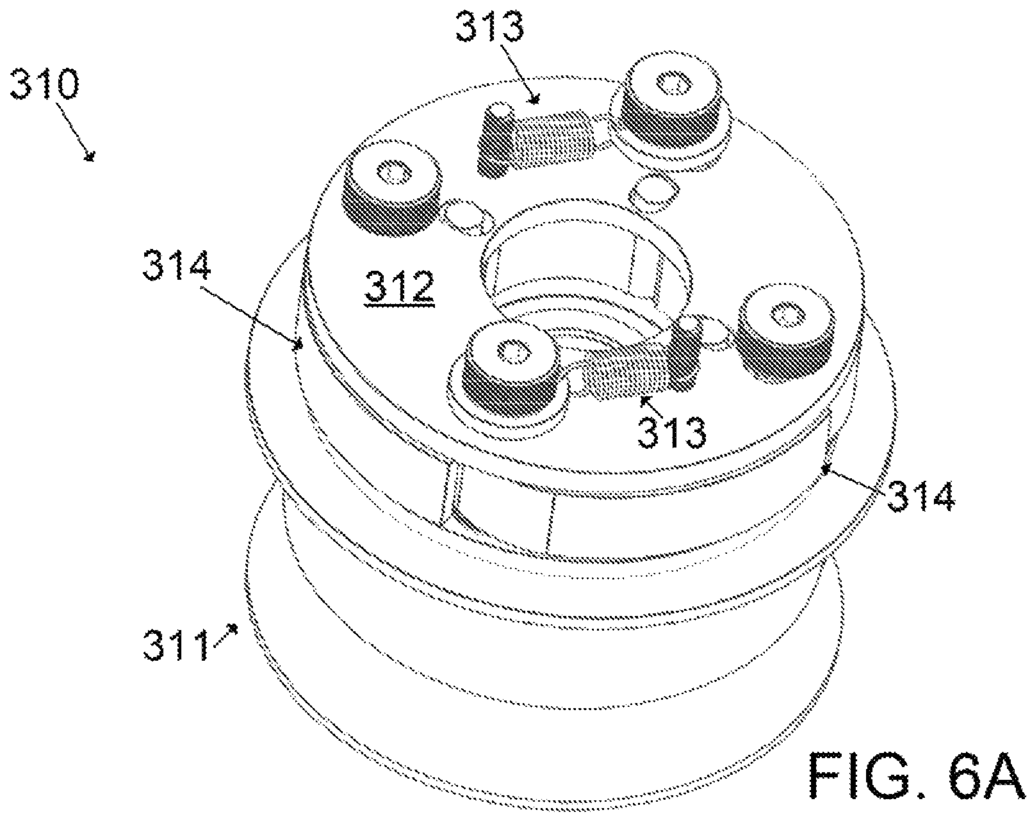
FIGS. 6A and 6B show perspective views of a centripetal cam assembly for an overspeed safety mechanism in a collapsed position and an extended position, respectively, in accordance with one or more aspects of the present disclosure.
Figure 6B:
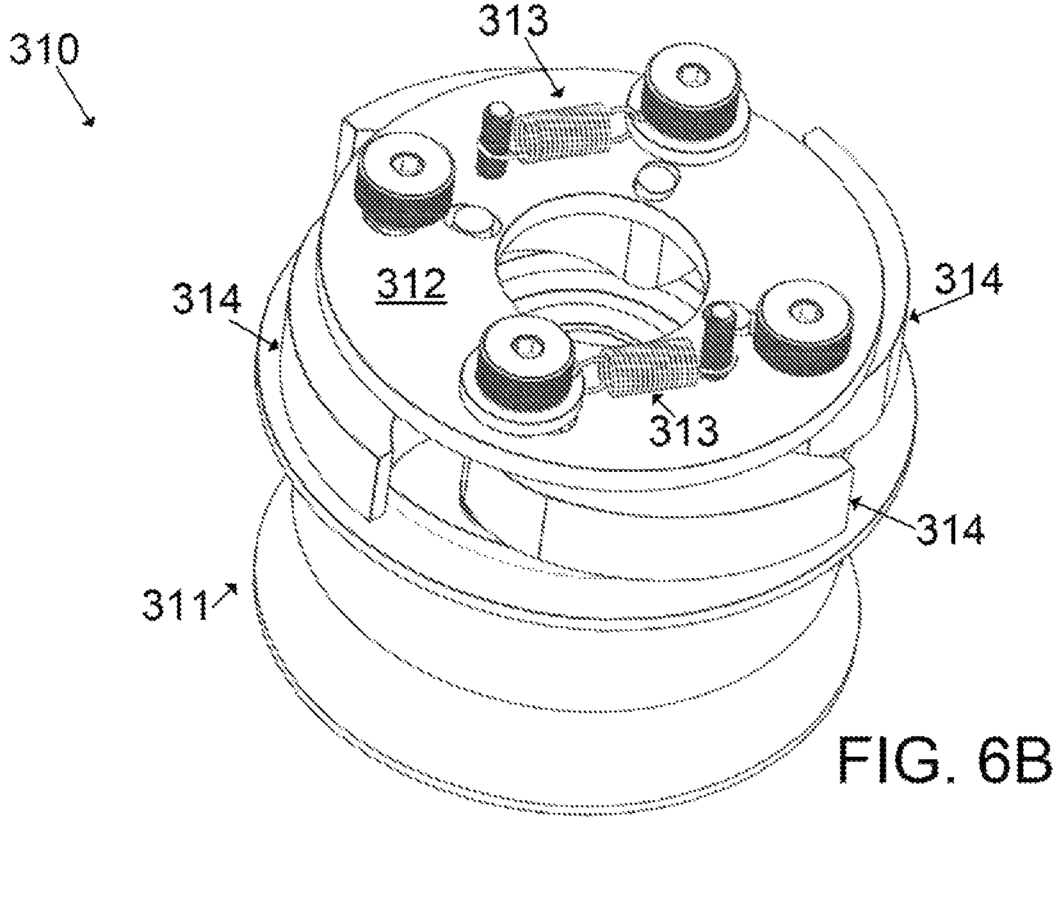

As the stairlift 100 may accelerate very quickly (e.g., an inadvertent rapid acceleration as the stairlift 100 moves down the stairway 10), and the angle of incline may be between 0 degrees and 60 degrees, the design of the centripetal cam assembly 310 may thus move to the extended position in a very small window (e.g., the instant the stairlift speed exceeds the speed threshold), which may be generally independent of the angle of incline. The spring-loaded plate 312 may act like a link that ties together the rotational motion of the plurality of centripetal cams 314, so that when gravity tries the pull a bottommost centripetal cam 314 open, gravity is also pulling an uppermost centripetal cam 314 closed. Accordingly, the four centripetal cams 314 shown in FIGS. 5A and 5B may work as two pairs of cams that, when tied together via the spring-loaded plate 312, cancel out gravitational forces. Only frictional forces (which may be minimized using various known methods) may remain to vary the speed threshold with the angle of incline of the stairlift. FIGS. 6A and 6B show perspective views of the centripetal cam assembly 310 in a collapsed position and an extended position, respectively.

A portion of a trigger plate 335 of the trigger assembly 330 is shown in FIGS. 5A and 5B. As shown in FIG. 5A, when in the collapsed position, the plurality of centripetal cams do not touch the trigger plate 335 as the centripetal cam assembly 310 rotates in the rotational direction 322. As shown in FIG. 5B, when in the extended position, at least one of the plurality of centripetal cams 314 will come in to contact with the trigger plate 335 as the centripetal cam assembly 310 rotates in the rotational direction 322. The extent to which the centripetal cams 314 move or rotate in the extended position may be constrained by the slots in the spring-loaded cam plate 312. This contact will push the trigger plate 335 into an impact direction 326 to an impact position 327. When in the impact position 327, the trigger plate 325 may be clear of contact with the centripetal cam assembly 310 rotating in the rotational direction 322.

Figure 7A:
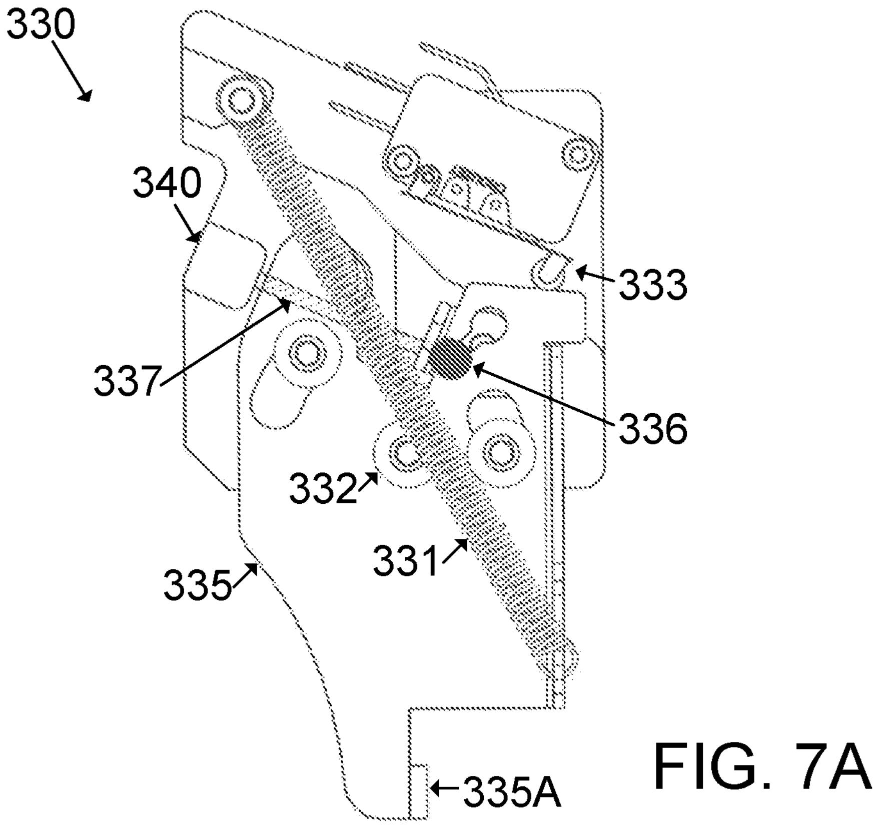
FIGS. 7A and 7B show front views of a trigger assembly for an overspeed safety mechanism in a non-impact position and an impact position, respectively, in accordance with one or more aspects of the present disclosure.
Figure 7B:
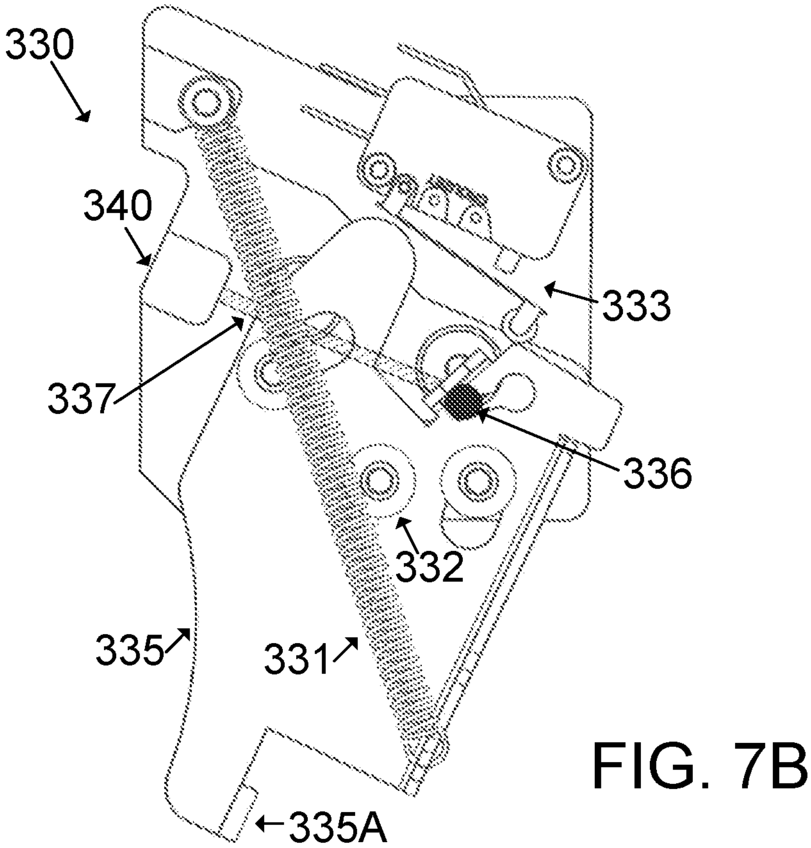

Now referring to FIGS. 7A and 7B, the trigger assembly 330 is shown in a non-impact position and an impact position, respectively, in accordance with one or more aspects of the present disclosure. The trigger assembly 330 may be mounted to a structure holding a shaft of the roller 133, as shown in FIGS. 2, 11A, 11B, and 12. Referring back to FIGS. 7A and 7B, the trigger assembly 330 includes a trigger plate 335 and a trigger spring 331 (or over-center spring) that may hold the trigger plate 335 in a standby position (the non-impact position) by having a counterclockwise load (in the view shown in FIG. 7A) relative to the a pivot formed by a pivot screw 332. In the non-impact or standby position, a switch 333 is held closed, thereby maintain power to the motor. As described above, the trigger plate 335 may come into contact with the centripetal cam assembly 310 when the centripetal cam assembly moves to the extended position. Upon at least one of the plurality of centripetal cams 314 impacting on the trigger plate 335 in an impact area 335A, the trigger plate will rotate clockwise relative to the pivot screw 332 until it locates to the impact position, as shown in FIG. 7B. In that regard, an extended centripetal cam 314 impacting the trigger plate 335 overpowers the trigger spring 331 thereby causing the trigger plate 335 to rotate relative to the pivot screw 332. Rotating the trigger plate 335 also opens a circuit via the opening of the switch 333, thereby cutting off power to the motor. The trigger spring 331 may be configured to hold the trigger plate 335 in place in the non-impact position and, after being impacted by at least one of the plurality of centripetal cams 314, to then constrain the trigger plate 335 in place in the impact position, e.g., until service has been performed on the stairlift. Accordingly, the trigger spring 331 may keep the trigger plate 335 in position during normal operation of the stairlift and prevent false triggers, while also being able to hold the trigger plate 335 in place in the impact position once activated (e.g., by movement of the centripetal cam assembly 310 to the extended position). The switch 333 may be configure to remain in the open position once the trigger plate 335 has been impacts, so that a user cannot simply move the unit back in place, until a service technician has attended to the assembly.

Figure 8A:
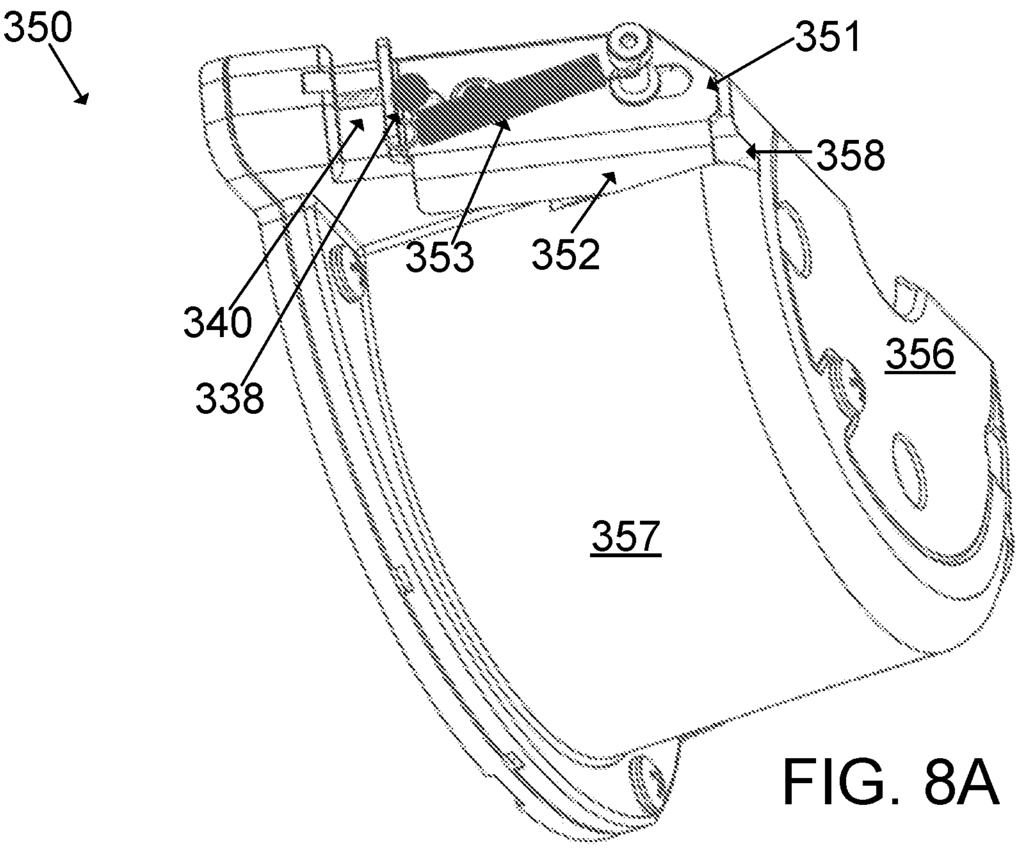
FIGS. 8A and 8B show perspective views of a jammer assembly for an overspeed safety mechanism in a standby position and an actuated position, respectively, in accordance with one or more aspects of the present disclosure.
Figure 8B:
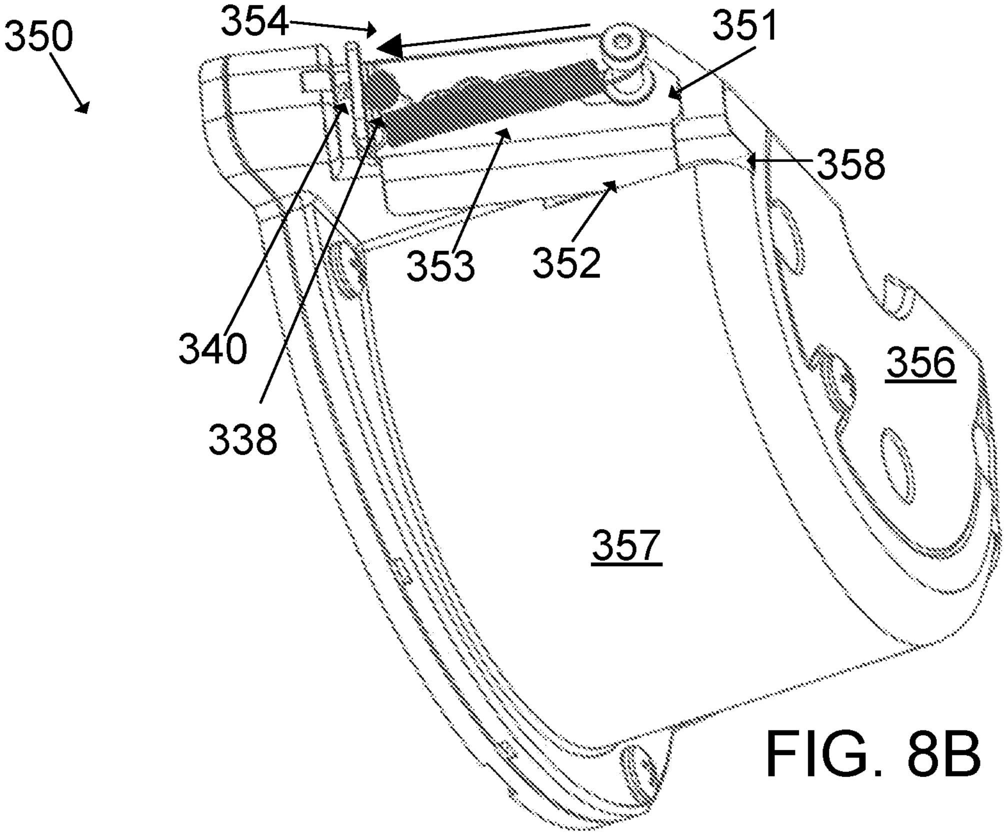

Impacting the trigger plate 335 may also pull a first cable nipple 336 at a first end of a cable wire 337 of a Bowden cable 340. The Bowden cable 340 may flexibly connect the trigger assembly 330 to the jammer assembly 350. As shown in FIGS. 8A and 8B, the Bowden cable 340 includes a second cable nipple 338 at a second end of the cable wire 337 at the jammer assembly 350.

As shown in FIGS. 8A and 8B, the jammer assembly 350 is shown in a standby position and an actuated position, respectively, in accordance with one or more aspects of the present disclosure. The jammer assembly 350 includes a retainer plate 351, a retainer plate flange 352, a retainer spring 353, a jammer 355 (not shown in the view of FIGS. 8A and 8B), and in inner housing 356 and out housing 357 in which the jammer 355 is retained when in the standby position. The retainer spring 353 may lightly pull on the retainer plate 351 so as to keep the retainer plate 351 at a preset distance from the second cable nipple 338 of the Bowden cable 340. For example, upon impacting the trigger plate 335 so as to pull the second cable nipple 338 of the Bowden cable 340, the Bowden cable 340 may pull the retainer plate 351 (e.g., by pulling on the retainer spring 353) into the actuated position as shown in FIG. 8B. In that regard, pulling the retainer plate 351 may result in a translational movement 354 of the retainer plate 351, with the retainer plate flange 352 sliding along a notch 358 of the outer housing 357 and inner housing 356.

Figure 9A:
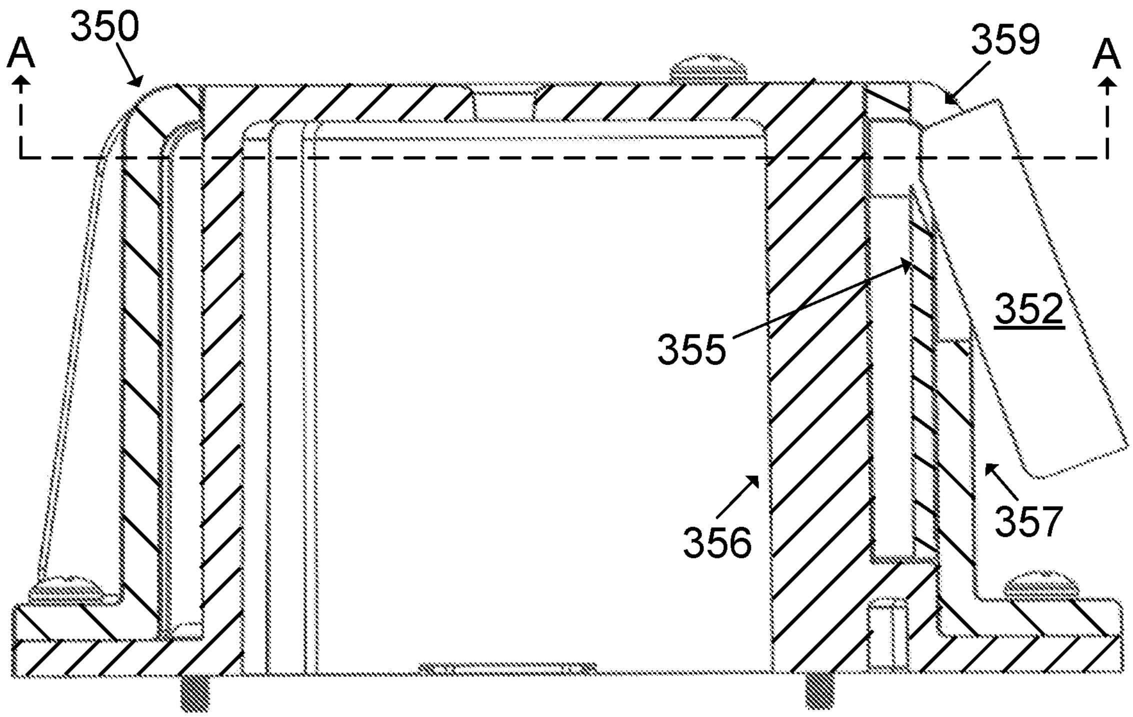
FIGS. 9A and 9B show cross-sectional views of a jammer assembly for an overspeed safety mechanism in a standby position and an actuated position, respectively, in accordance with one or more aspects of the present disclosure.
Figure 9B:
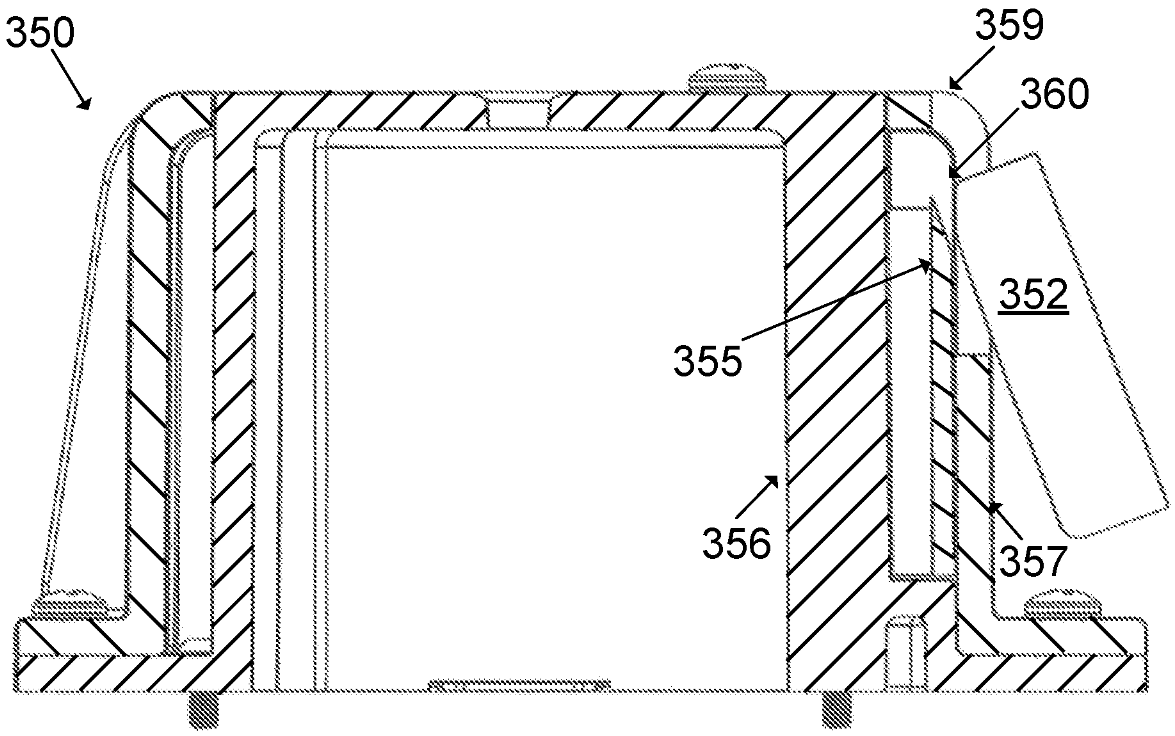

FIGS. 9A and 9B show cross-sectional views of a jammer assembly 350 for an overspeed safety mechanism in a standby position and an actuated position, respectively, in accordance with one or more aspects of the present disclosure. As shown in the cross-sectional view of FIG. 9A, the retainer plate flange 352 may be located in a cavity 359 between the inner housing 356 and the outer housing 357. The jammer 355 may be spring-loaded in a jammer compartment 362 (through a slot 360 in the cavity 359 in the outer housing 357), which retains the jammer 355 therein while the jammer assembly 350 remains in the standby position. In that regard, the retainer flange 352, while in the standby position, may penetrate into the jammer compartment 362 and into a slot 360 in the cavity 359. Upon the retainer plate 351 being pulled (e.g., by the Bowden cable 340), the retainer plate flange 352 may move downward (according to the cross-sectional view of FIGS. 9A and 9B) such that the jammer assembly 350 is in the actuated position. Movement of the retainer plate flange 352, may be in the order of several millimeters, such as 4-8 millimeters, or on the order of 6 millimeters. As the retainer plate flange 352 is moved down and out of the jammer compartment 362, as shown in FIG. 9B, the slot 360 is uncovered so as to form an opening 360 in the cavity 359, thereby the spring-loaded jammer is released.

Figure 10:
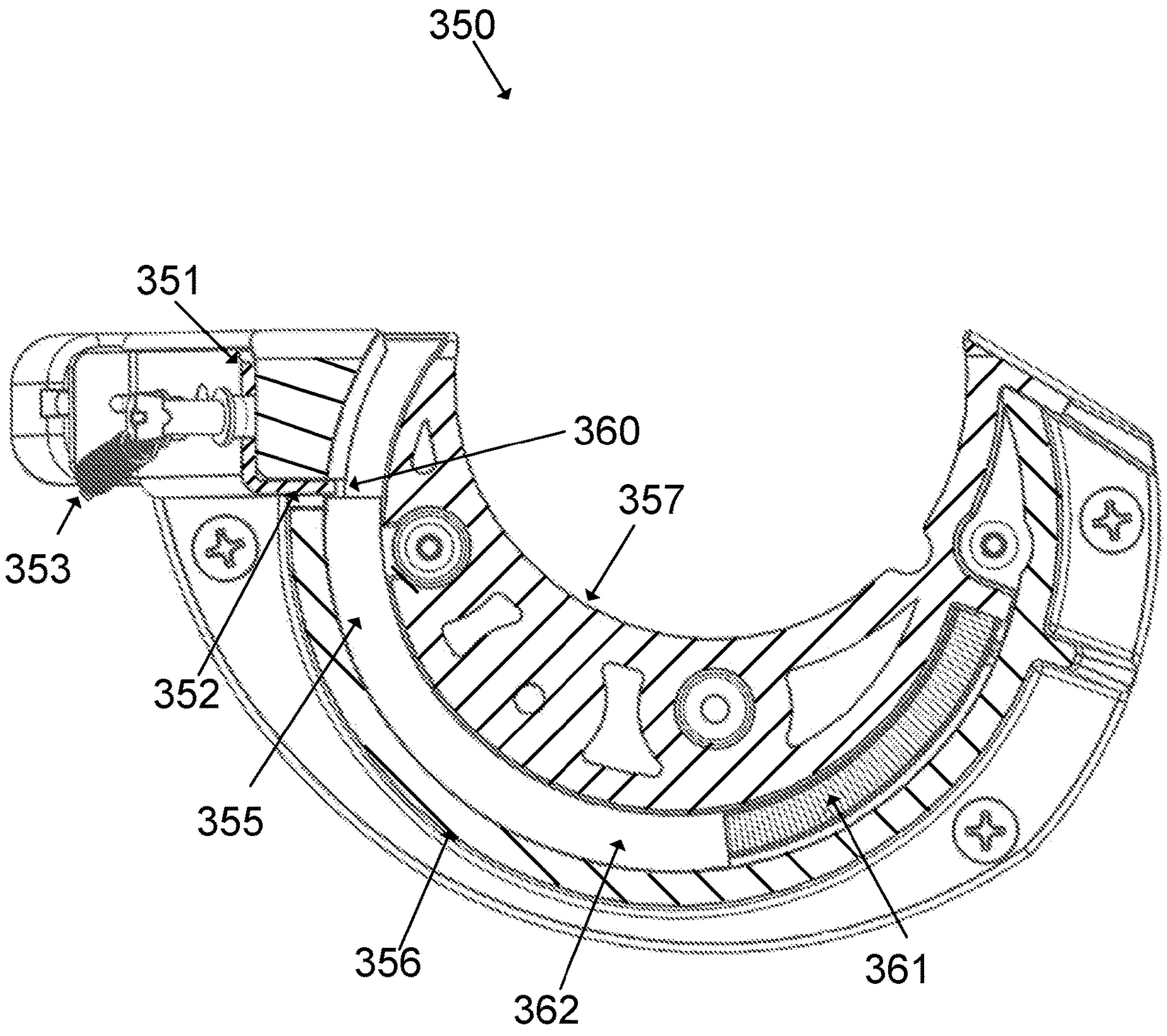
FIG. 10 shows a cross-sectional view of a jammer assembly for an overspeed safety mechanism in a standby position, in accordance with one or more aspects of the present disclosure.

Now referring to FIG. 10, a cross-sectional view of section A-A of FIG. 9A of the jammer assembly 350 is shown in a standby position. The retainer plate 351 may hold back the spring-loaded jammer 355, e.g., spring-loaded by one or more jammer springs 361, in a jammer compartment 362 while in the standby position. The spring-loaded jammer 355 may be released from the jammer compartment 362 by the Bowden cable 340 pulling on the retainer plate 351. As the jammer 355 is released from the jammer compartment 362, the jammer may wedge into the rack of the rack and pinion system 135, thereby halting movement of the rack along the pinion of the drive mechanism 130. The jammer 355 may be formed of a compliant material. The jammer 355 may be formed in a wedge shaped that progressively (e.g., linearly) gets thicker from a first end to a second end.

Releasing the retainer plate 351 may allow the jammer 355 to rotate into a gap between teeth of the rack and pinion system 135 to initiate a deceleration of the stairlift upon the motor being shut off by the centripetal cam assembly 310 and the trigger assembly 330 as described above. In that regard, the rotary motion of the pinion gear may shear and deform the jammer 355 as the jammer 355 is pulled progressively farther into the rack and pinion system 135, as will be described in more detail below. Kinetic energy may thus be absorbed by the jammer 355 shearing and deforming while being pulled farther into the rack and pinion system 135. Proportionally more kinetic energy may be absorbed as the portion of the jammer 355 being pulled into the rack and pinion system 135 progressively gets thicker until the velocity of the carriage goes to zero. The thickness profile of the jammer 355 (e.g., in a wedge shaped that progressively gets thicker from a first end to a second end) may function to initiate deceleration of the stairlift in coming to a stop, e.g., when the stairlift speed exceeds the speed threshold.

Figure 11A:
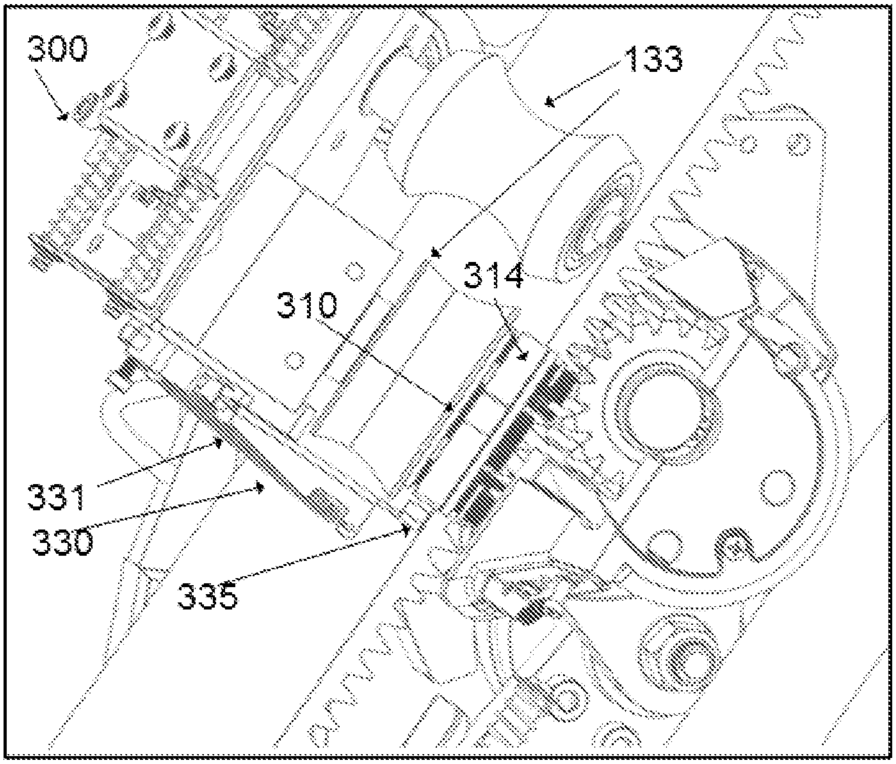
FIGS. 11A and 11B show perspectives views of an overspeed safety mechanism, mounted to a motorized stairlift, in an operational position and an actuated position, respectively, in accordance with one or more aspects of the present disclosure.
Figure 11B:
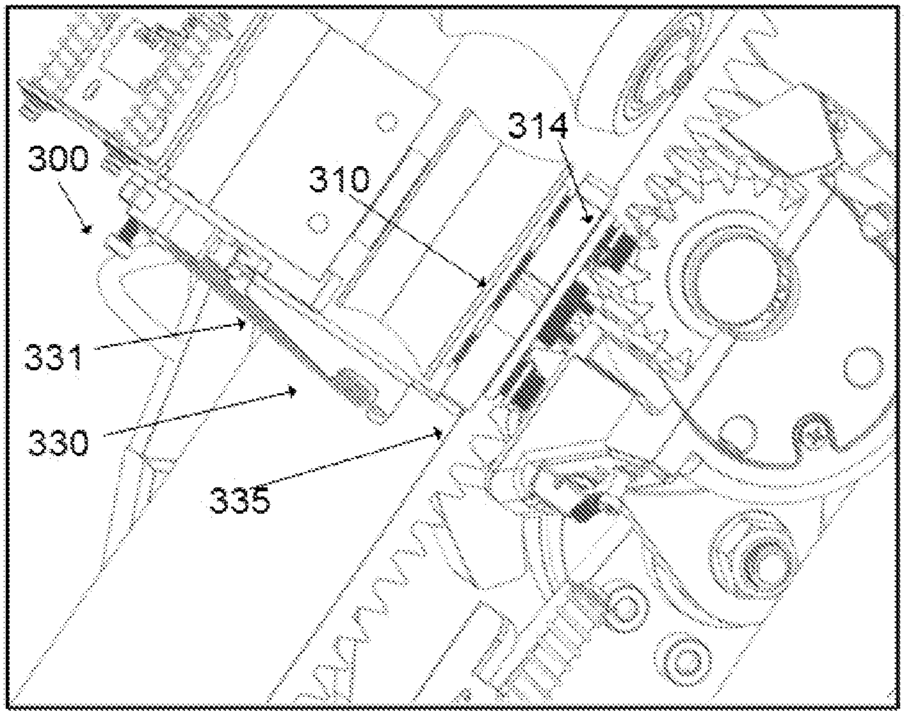

FIGS. 11A and 11B show perspective views of an overspeed safety mechanism 300 mounted to a motorized stairlift in an operational position and an actuated position, respectively, in accordance with one or more aspects of the present disclosure. FIGS. 11A and 11B show the centripetal cam assembly 310 and the trigger assembly 330 of the overspeed safety mechanism 300. Also shown is the rack and pinion system 135 and the roller 133. As shown in the operational position depicted in FIG. 11A, the plurality of centripetal cams 314 remain closed (in the collapsed position) and out of contact with the trigger plate 335 of the trigger assembly 330. As shown in the actuated position depicted in FIG. 11B, the plurality of centripetal cams 314 have opened (in the extended position) and now contact with the trigger plate 335 of the trigger assembly 330 in an impact area 335A.

Accordingly, the overspeed safety mechanism 300 for a motorized stairlift may include a centripetal cam assembly 310 and a trigger assembly 330. The motorized stairlift may include a curved stairlift with a dual rail system, and the centripetal cam assembly 310 may then be mounted to an upper roller 133 of the dual rail system. The centripetal cam assembly 310 may include a spring-loaded plate 312 and a plurality of centripetal cams 314 connected to the spring-loaded plate 312. The spring-loaded plate 312 may be configured to hold the plurality of centripetal cams 314 in a collapsed position when the stairlift operates at a rail speed below a speed threshold. The plurality of centripetal cams 314 may be configured to move to an extended position when the rail speed exceeds the speed threshold. The trigger assembly 330 may be operably connected to the centripetal cam assembly 310 and may be configured to be impacted by at least one of the plurality of centripetal cams 314, when the plurality of centripetal cams 314 move to the extended position, so as to cause a switch to open to shut off motor power to the motorized stairlift.

As shown in FIGS. 11A and 11B, the plurality of centripetal cams 314 may include one or more pairs of centripetal cams 314. For each of the one or more pairs of centripetal cams 314, a first cam may be positioned directly across a second cam along a centerline of the spring-loaded plate, so as to cancel out gravitational effects. The plurality of centripetal cams 314 may include four centripetal cams radially spaced around the spring-loaded plate 312. In some examples, the plurality of centripetal cams 314 may be configured to move from the collapsed position shown in FIG. 11A to the extended position shown in FIG. 11B by converting translational motion of the motorized stairlift to centripetal motion around the spring-loaded plate 312 as the rail speed exceeds the speed threshold.

The trigger assembly 330 may include a trigger plate 335. At least one of the plurality of centripetal cams 314, when moved to the extended position, may then be configured to push the trigger plate 335 to open the switch. The trigger plate 335 may be configured to push open the switch when impacted by at least one of the plurality of centripetal cams 314 when the centripetal cam assembly 310 moves to the extended position shown in FIG. 11B, and an over-center spring 331 configured to retain the trigger plate 335 in an operational position with the switch closed while the centripetal cam assembly 310 remains in a collapsed position, as shown in FIG. 11A. The over-center spring 331 may be configured to rotate the trigger plate 335 upon at least one of the plurality of centripetal cams 314 pushing the trigger plate 335 when the centripetal cam assembly 310 moves to the extended position shown in FIG. 11B. Rotating the trigger plate 335 may cause the switch to open. The over-center spring 331 may be configured to retain the trigger plate 335 in a first location while in the operational position shown in FIG. 11A, and to retain the trigger plate 335 in a second location after being pushed to hold open the switch as shown in FIG. 11B. The trigger assembly 330 may be mounted to a structure holding a roller assembly 133 of the motorized stairlift.

Accordingly, a method of controlling a motorized stairlift with an overspeed safety apparatus is provided, that includes actuating the plurality of centripetal cams 314 connected to the spring-loaded plate 312 when the stairlift operates at a rail speed exceeding the speed threshold, pushing, by at least one of the plurality of centripetal cams 314 being actuated, a trigger plate 335, and opening, by the trigger plate 335 being pushed, a switch to shut off motor power to the motorized stairlift. Actuating the plurality of centripetal cams 314 may include converting translation motion of the motorized stairlift to centripetal motion around the spring-loaded plate 312 as the rail speed exceeds the speed threshold.

Figure 12:
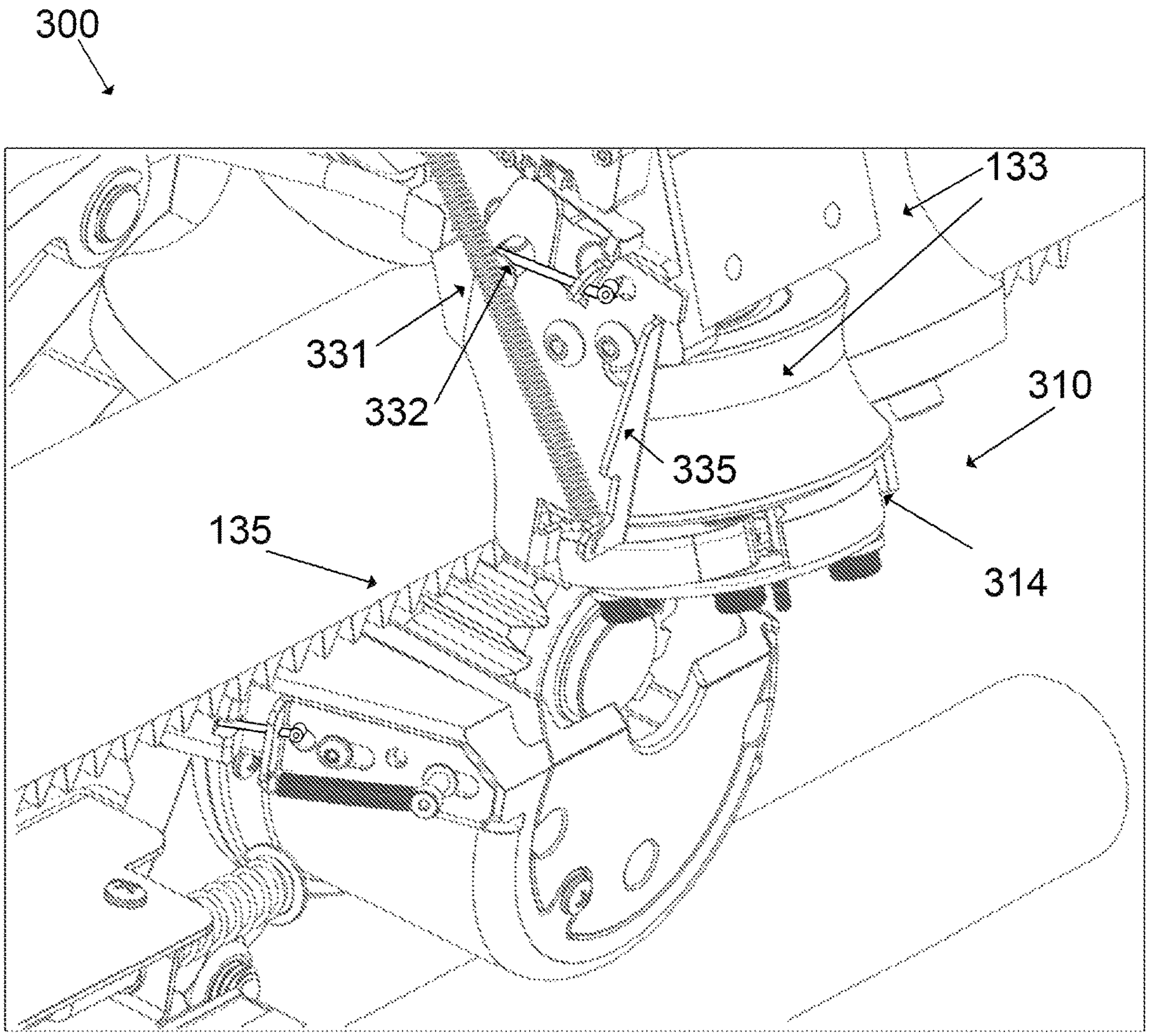
FIG. 12 shows a perspective view of an overspeed safety mechanism, mounted to a motorized stairlift, in an actuated position in accordance with one or more aspects of the present disclosure.

FIG. 12 shows a perspective view of an overspeed safety mechanism 300, mounted to a motorized stairlift, in an actuated position in accordance with one or more aspects of the present disclosure. FIG. 12 shows the centripetal cam assembly 310 and the trigger assembly 330 of the overspeed safety mechanism 300. Also shown is the rack and pinion system 135 and the roller 133. As shown in the actuated position depicted in FIG. 12, the plurality of centripetal cams 314 are opened (in the extended position). As described above, when in the extended position, at least one of the plurality of centripetal cams 314 will come in to contact with the trigger plate 335 as the centripetal cam assembly 310 rotates. This contact will push the trigger plate 335 to an impact position, in which the trigger plate 325 may be clear of contact with the rotating centripetal cam assembly 310. In the impact position, the trigger plate 335 may rotate about the pivot screw 332, which may then open the switch 333, thereby cutting off power to the motor. The trigger spring 331 may then constrain the trigger plate 335 in place in the impact position, e.g., until service has been performed on the stairlift. The switch 333 may be configure to remain in the open position once the trigger plate 335 has been impacted, so that the unit remains in the actuated position, until a service technician has attended to the assembly.

In some embodiments, the overspeed safety mechanism 300 may further include a jammer assembly 350 operably connected to the trigger assembly 330. The jammer assembly 350 may include a jammer 355. Impacting the trigger assembly 330 may cause the jammer 355 to wedge between teeth of a rack and pinion system 135 of the motorized stairlift to initiate deceleration of the motorized stairlift upon shutting off motor power to the motorized stairlift. The overspeed safety apparatus may further include a Bowden cable 340 flexibly connecting the trigger assembly 330 to the jammer assembly 350. The trigger assembly 330 may pull the Bowden cable 340 when impacted by at least one of the plurality of centripetal cams 314.

The jammer assembly 350 may include a retainer plate 351 configured to retain the jammer 355 in place in an operational position and, upon the trigger assembly 330 being impacted by at least one of the plurality of centripetal cams 314, to be actuated so as to release the jammer 355. The jammer 355 may be spring loaded into a jammer compartment 362 of the jammer assembly 350 and may be retained in the jammer compartment 362 by the retainer plate 351 in the operational position. Movement of the trigger assembly 330 upon being impacted by at least one of the plurality of centripetal cams 314 may cause a cable to pull the retainer plate 351 so as to release the jammer 355 spring-loaded in the jammer compartment 362. The jammer 355 may be formed of a compliant plastic (e.g., polypropylene) material shaped progressively thicker from a first end to a second end.

Figure 13A:
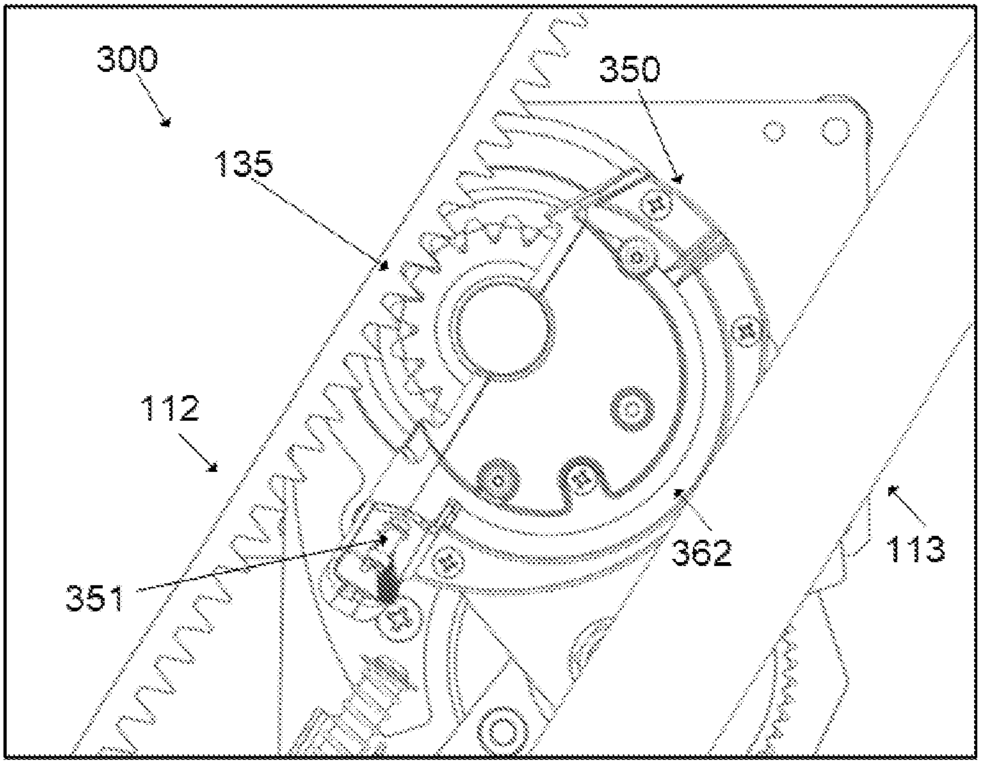
FIGS. 13A and 13B show perspective views of an overspeed safety mechanism, mounted to a motorized stairlift, in an operational position and an actuated position with a jammer initially actuated, respectively, in accordance with one or more aspects of the present disclosure.
Figure 13B:
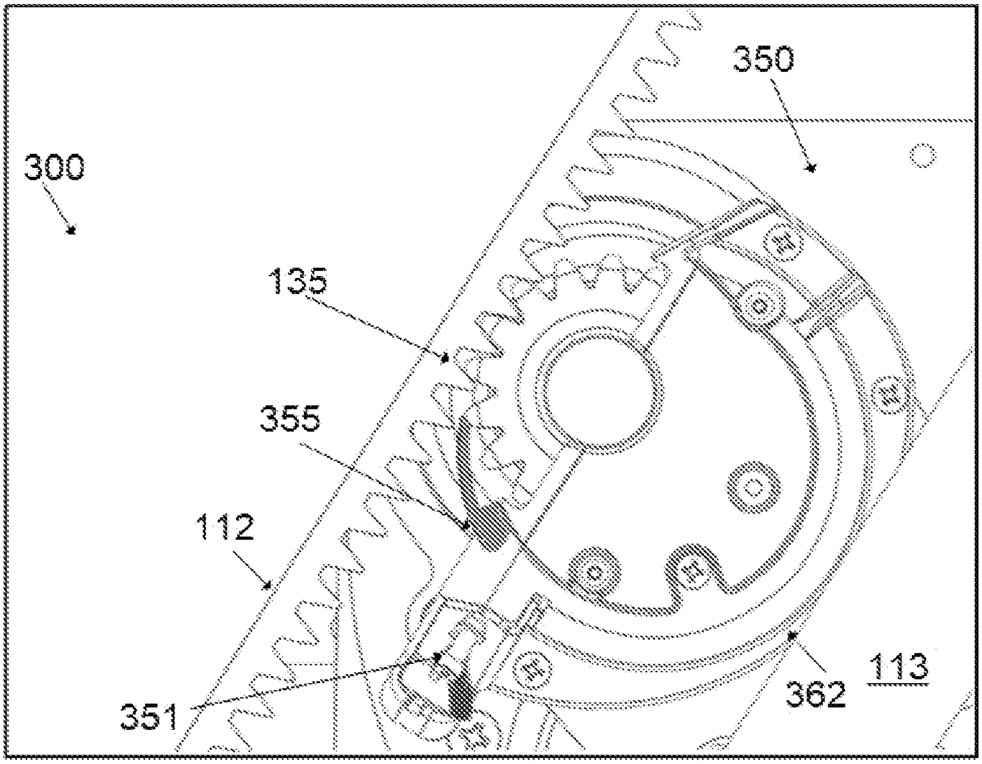

FIGS. 13A and 13B show perspective views of an overspeed safety mechanism 300, mounted to a motorized stairlift, in an operational position and an actuated position with a jammer 355 of a jammer assembly 350 initially actuated, respectively, in accordance with one or more aspects of the present disclosure. Also shown is upper rail 112, the lower rail 113, and the rack and pinion system 135. As shown in the operational position depicted in FIG. 13A, the retainer plate 351 of the jammer assembly 350 keeps the spring-loaded jammer 355 in the jammer compartment 362.

As shown in the actuated position depicted in FIG. 13B, the retainer plate 351 has been pulled (e.g., by the trigger plate 335 pulling on the Bowden cable 340). Pulling the retainer plate 351 moves the retainer plate flange 352 such that an opening 360 is formed in the cavity 359, thereby releasing the spring-loaded jammer 355. As the jammer 355 is released from the jammer compartment 362, the jammer 355 may wedge into the rack of the rack and pinion system 135, thereby halting movement of the rack along the pinion of the rack and pinion system 135.

Figure 14A:
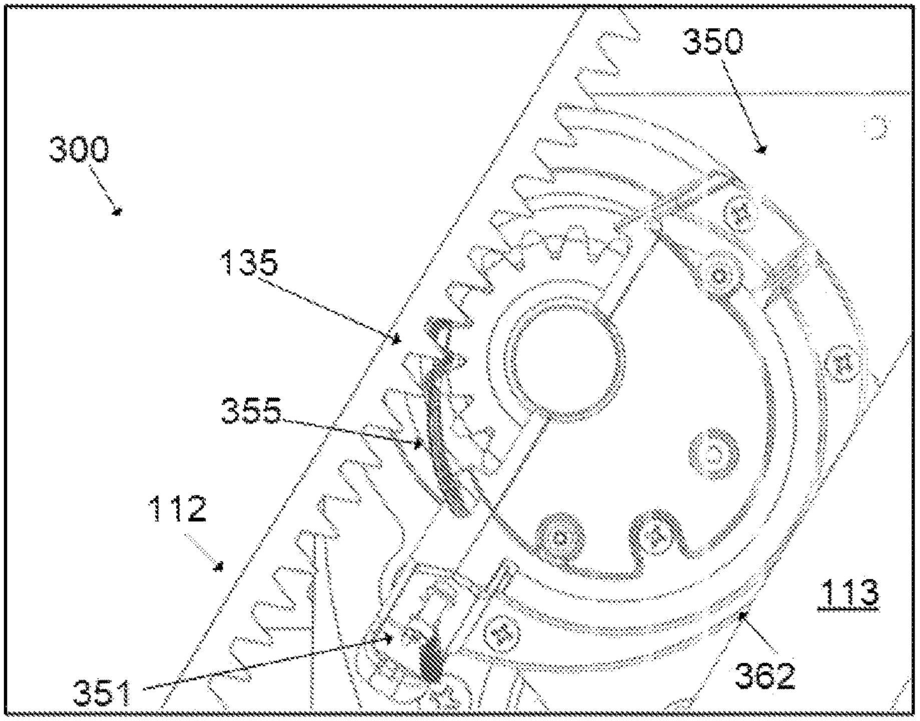
FIGS. 14A and 14B show perspective views of an overspeed safety mechanism, mounted to a motorized stairlift, in an actuated position with a jammer partially actuated and fully actuated in accordance with one or more aspects of the present disclosure.
Figure 14B:
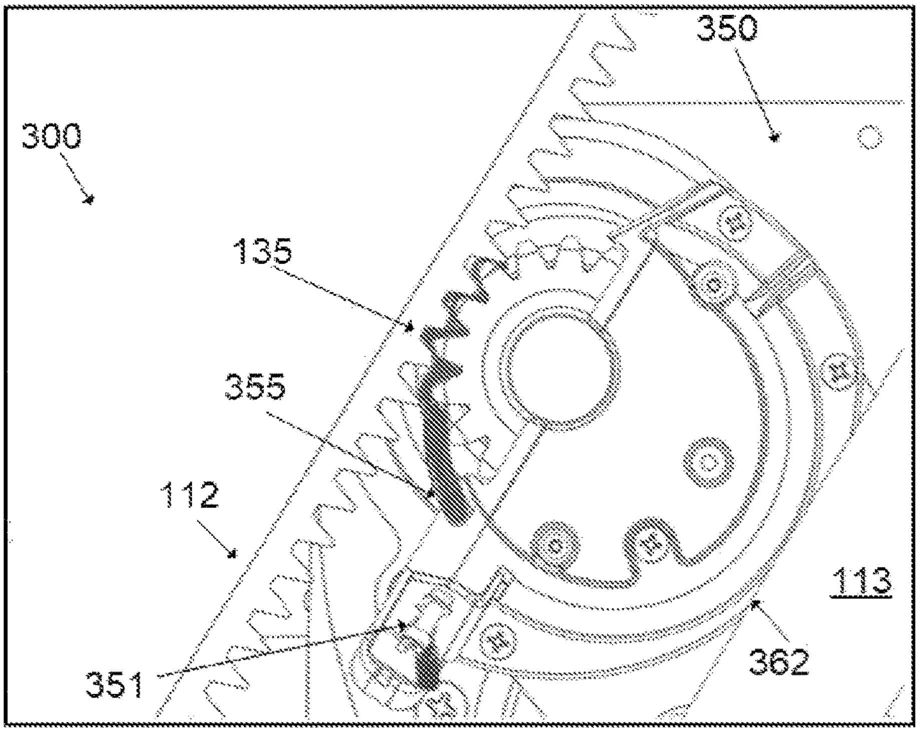

FIGS. 14A and 14B show perspective views of an overspeed safety mechanism, mounted to a motorized stairlift, in an actuated position with a jammer progressively wedged into rack and pinion system. FIGS. 13A, 13B, 14A, and 14B thus illustrate various phases at which portions of the jammer assembly 350 actuate and progressively wedge farther into the rack and pinion system 135. As described above, releasing the retainer plate 351 may allow the jammer 355 to rotate into a gap between teeth of the rack and pinion system 135 to initiate deceleration of the stairlift upon the motor being shut off by the centripetal cam assembly 310 and the trigger assembly 330 when a stairlift speed exceeds a speed threshold. The rotary motion of the pinion gear of the rack and pinion system 135 may shear and deform the jammer 355 as the jammer 355 is pulled progressively farther into the rack and pinion system 135, as shown in the progression from FIG. 13B to FIG. 14A and to FIG. 14B. The jammer will be progressively pulled into the system until all of the kinetic energy is dissipated and the carriage velocity is zero.

Thus, as described above, an overspeed safety mechanism 300 for a motorized stairlift may include a stairlift rail or track 110, a carriage 120 configured to be driven along the motorized stairlift by a rack and pinion system 135, and a motor configured to power movement of the carriage 120 along the stairlift rail. The overspeed safety mechanism 300 may include a jammer assembly 350 with a jammer 355 to be released upon a rail speed of the stairlift rail exceeding a speed threshold. Releasing the jammer 355 may cause the jammer 355 to wedge between teeth of the rack and pinion system 135 to initiate deceleration of the motorized stairlift upon shutting off motor power to the motorized stairlift.

As described, the jammer assembly 350 may further include a retainer plate 351 configured to retain the jammer 355 in place in an operational position and, upon the rail speed of the stairlift rail exceeding the speed threshold, to be actuated so as to release the jammer 355. The jammer 355 may be spring loaded into a jammer compartment 362 of the jammer assembly 350 and may be retained in the jammer compartment 362 by the retainer plate 351 when in the operational position. A cable 340 may be configured to pull the retainer plate 351 upon the rail speed of the stairlift rail exceeding the speed threshold so as to release the jammer 355 spring-loaded in the jammer compartment 362.

In some examples, the jammer 355 may be formed of a flexible, tough material, such as polypropylene. The jammer 355 may have a wedge shape with a progressively increasing thickness from a first end to a second end. In some examples, the jammer 355 may be configured to shear and deform upon being wedged into the teeth of the rack and pinion system 135 to control a rate of deceleration of the motorized stairlift upon the motor being shut off.

Accordingly, a method of actuating the overspeed safety mechanism 300 for the motorized stairlift 100 may include mechanically actuating a trigger plate 335 so as to open a switch to shut off motor power to the motorized stairlift, upon the trigger plate 335 being actuated, releasing a jammer 355 from a jammer compartment 362, and wedging the jammer 355 between teeth of the rack and pinion system 135 of the motorized stairlift to initiate a deceleration to stop movement of the motorized stairlift.

The step of releasing the jammer 355 may include moving a retainer plate 351 so as to release the jammer 355 spring-loaded in the jammer compartment 362. Wedging the jammer 355 may include shearing and deforming the jammer 355 upon being wedged into the teeth of the rack and pinion to control the deceleration rate of the motorized stairlift upon the motor being shut off. Mechanically actuating the trigger plate 335 may include moving a plurality of centripetal cams 314 connected to a spring-loaded plate 312 from a collapsed position to an extended position when the stairlift operates at a rail speed exceeding the speed threshold. In some examples, the method may further include pushing at least one of the plurality of centripetal cams 314 into the trigger plate 335 upon the plurality of centripetal cams 314 moving to the extended position, and causing, by movement of the trigger plate 335 being pushed, the switch to open to shut off motor power to the motorized stairlift.

As described above, the motorized stairlift includes a track 110 or stairlift rail including rail sections that, when installed, are arranged at different angles to a horizontal plane, a carriage 120 mounted on the track 110 for movement along the track 110 by the rack and pinion system 135, a motor configured to power movement of the carriage 120 along the track 110, and an overspeed safety mechanism 300 configured to shut off the motor and to stop movement of the carriage 120 along the stairlift rail when a speed of the track 110 exceeds a speed threshold. The overspeed safety mechanism 300 may include a jammer assembly 350 with a jammer 355 configured to be released upon the track speed exceeding a speed threshold. Releasing the jammer 355 may then cause the jammer 355 to wedge between teeth of the rack and pinion system 135 to initiate a deceleration to stop movement of the motorized stairlift.

The jammer assembly 350 may further include a retainer plate 351 configured to retain the jammer 355 in place in an operational position and, upon the speed of the stairlift rail exceeding a speed threshold, to be actuated so as to release the jammer 355. The jammer 355 may be spring loaded into the jammer compartment 362 and may be retained in the jammer compartment 362 by the retainer plate 351 when in the operational position. The trigger assembly 330 may be operably connected to the jammer assembly 350 and configured to impact the jammer assembly 350 to release the jammer 355.

The stairlift rail or track 110, when installed, may form a curved stairlift with an incline that may vary between 0 degrees and 60 degrees. The stairlift rail may include a dual rail system with an upper roller and a lower roller, and at least a portion of the overspeed apparatus may be mounted to an upper roller of the dual rail system. A stop distance, defined by a distance that the carriage moves between a point at which the rail speed exceeds the speed threshold and a point at which the carriage comes to a stop, may be less than 6 inches. In some examples, the jammer may include a plastic material formed of a suitable shape. For example, the jammer may be formed of a shape of varying thickness from a first end to a second end.

As described above, kinetic energy may thus be absorbed by the jammer 355 shearing and deforming while being pulled farther into the rack and pinion system 135, as the portion of the jammer 355 being pulled into the rack and pinion system 135 progressively gets thicker. The thickness profile of the jammer 355 (e.g., in a wedge shaped that progressively, and in some instances linearly, gets thicker from a first end to a second end) may function to initiate a controlled deceleration of the stairlift in coming to a stop, e.g., when the stairlift speed exceeds the speed threshold. Controlling the rate of deceleration has the benefit of preventing the jerking and potential launch of the person being transported on the stairlift. In that regard, jerking may be reduced or prevented by initiating a small deceleration at the beginning, bringing the system to a stop gently, and with a larger deceleration in between. Accordingly, the jammer assembly 350 may function similar to a crumple zone in a vehicle in softening the impact of a sudden deceleration. The retainer spring 353 may function to ensure that the retainer plate 351 does not pull away and thus release the jammer 355 due to vibration, but only upon the Bowden cable 340 pulling on the retainer plate 351. Thus, the retainer spring 353 may prevent the false actuations of the jammer assembly.

While the plurality of centripetal cams 314 in the embodiments illustrated herein depict four centripetal cams, the number of centripetal cams may be varied without departing form the scope of the present disclosure. For example, some centripetal cam assemblies may include two centripetal cams, three centripetal cams, or more than four centripetal cams.

The shape and material makeup of the jammer 355 may vary in a number of respects without departing from the scope of the present disclosure. In some examples, a profile of the jammer 355 may provide a linear increase in thickness. The jammer 355 may be constructed using one or more plastic or metal materials. Such materials may include, but are not limited to acrylonitrile butadiene styrene (ABS), aluminum, ultra-high molecular weight (UHMW) polyethylene, nylon, polypropylene, and the like. Profiles and material compositions of the jammer 355 may function to initiate deceleration of the carriage efficiently and smoothly while stopping the carriage within a predefined distance (e.g., 4-6 inches of travel). The jammer 355 may be used in varying type of double and single rail curved stairlift systems.

Overspeed safety mechanisms as described herein beneficial provide a safe braking mechanism when an overspeed condition occurs in all conditions of stairlift use, e.g., at sharp inclines and/or when navigating a curve in the stairway. Additionally, the occurrence of false triggers are reduced or minimized.

It will be understood by those skilled in the art that the disclosure is not limited to the examples provided above and in the accompanying drawings. Modifications may be made by those skilled in the art, particularly in light of the foregoing teachings. Each of the features of the examples may be utilized alone or in combination or sub-combination with elements of the other examples and/or with other elements. For example, any of the above described methods or parts thereof may be combined with the other methods or parts thereof described above. The steps shown in the figures may be performed in other than the recited order, and one or more steps shown may be optional. It will also be appreciated and understood that modifications may be made without departing from the true spirit and scope of the present disclosure.

What is claimed is:

1. A motorized stairlift comprising:

a stairlift rail including rail sections that, when installed, are arranged at different angles to a horizontal plane;

a carriage mounted on the stairlift rail for movement along the stairlift rail by a rack and pinion system;

a motor configured to power movement of the carriage along the stairlift rail through the rack and pinion system; and an overspeed apparatus configured to shut off the motor and to stop movement of the carriage along the stairlift rail when a speed of the stairlift rail exceeds a speed threshold, wherein the overspeed apparatus comprises:

a jammer assembly comprising a jammer configured to be released upon the speed of the stairlift rail exceeding a speed threshold, wherein releasing the jammer causes the jammer to wedge between teeth of the rack in the rack and pinion system to initiate a deceleration to stop movement of the motorized stairlift.

2. The motorized stairlift of claim 1, wherein the overspeed apparatus further comprises a trigger assembly operably connected to the jammer assembly and configured to impact the jammer assembly to release the jammer.

3. The motorized stairlift of claim 1, wherein the jammer assembly further comprises a retainer plate configured to retain the jammer in place in an operational position and, upon the speed of the stairlift rail exceeding a speed threshold, to be actuated so as to release the jammer.

4. The motorized stairlift of claim 3, wherein the jammer is spring loaded into a jammer compartment of the jammer assembly and is retained in the jammer compartment by the retainer plate when in the operational position.

5. The motorized stairlift of claim 4, wherein the stairlift rail, when installed, forms a curved stairlift with an incline that varies between 0 degrees and 60 degrees.

6. The motorized stairlift of claim 1, wherein the stairlift rail comprises a dual rail system with an upper roller and a lower roller, and wherein at least a portion of the overspeed apparatus is mounted to an upper roller of the dual rail system.

7. The motorized stairlift of claim 1, wherein a stop distance, defined by a distance that the carriage moves between a point at which the rail speed exceeds the speed threshold and a point at which the carriage comes to a stop, is less than 6 inches.

8. The motorized stairlift of claim 1, wherein the jammer comprises a plastic material and is formed of a wedge shape.

9. An overspeed safety apparatus for a motorized stairlift comprising a stairlift rail, a carriage configured to be driven along the motorized stairlift by a rack and pinion system, and a motor configured to power movement of the carriage along the stairlift rail through the rack and pinion system, wherein the overspeed safety apparatus comprises:

a jammer assembly comprising a jammer configured to be released upon a rail speed of the stairlift rail exceeding a speed threshold, wherein releasing the jammer causes the jammer to wedge between teeth of the rack in the rack and pinion system to initiate a deceleration to stop movement of the motorized stairlift;

wherein the jammer comprises a wedge shape with a linearly increasing thickness from a first end to a second end.

10. The overspeed safety apparatus of claim 9, wherein the jammer is formed of a compliant polypropylene material.

11. The overspeed safety apparatus of claim 10, wherein the jammer assembly further comprises a retainer plate configured to retain the jammer in place in an operational position and, upon the rail speed of the stairlift rail exceeding the speed threshold, to be actuated so as to release the jammer.

12. The overspeed safety apparatus of claim 11, wherein the jammer is spring loaded into a jammer compartment of the jammer assembly and is retained in the jammer compartment by the retainer plate when in the operational position.

13. An overspeed safety apparatus for a motorized stairlift, the overspeed safety apparatus comprising:

a centripetal cam assembly comprising plurality of centripetal cams linked together and configured to hold the plurality of centripetal cams in a collapsed position when the stairlift operates at a rail speed below a speed threshold and wherein the plurality of centripetal cams are configured to move to an extended position when the rail speed exceeds the speed threshold;

a trigger assembly operably connected to the centripetal cam assembly, and configured to be impacted by at least one of the plurality of centripetal cams, when the plurality of centripetal cams move to the extended position, so as to cause a switch to open to shut off motor power to the motorized stairlift; and a jammer assembly operably connected to the trigger assembly and comprising a jammer;

wherein the jammer is formed of a plastic material shaped progressively thicker from a first end to a second end;

wherein trigger assembly comprises a trigger plate, and wherein at least one of the plurality of centripetal cams, when moved to the extended position, is configured to push the trigger plate to open the switch; and wherein the plurality of centripetal cams comprises four centripetal cams radially spaced around a spring-loaded linkage plate.

14. The overspeed safety apparatus of claim 13, wherein the plurality of centripetal cams comprise one or more pairs of centripetal cams, and wherein, for each of the one or more pairs of centripetal cams, a first cam is positioned directly across a second cam along a centerline of the spring-loaded linkage plate and linked together, so as to cancel out gravitational effects.

15. The overspeed safety apparatus of claim 13, wherein the plurality of centripetal cams are configured to move from the collapsed position to the extended position by converting translational motion of the motorized stairlift to centripetal motion around the spring-loaded linkage plate as the rail speed exceeds the speed threshold.

16. The overspeed safety apparatus of claim 13, wherein the trigger assembly further comprises:

a trigger plate configured to push open the switch when impacted by at least one of the plurality of centripetal cams when the centripetal cam assembly moves to the extended position; and an over-center spring configured to retain the trigger plate in an operational position with the switch closed while the centripetal cam assembly remains in a collapsed position.

17. The overspeed safety apparatus of claim 16, wherein the over-center spring is further configured to rotate the trigger plate upon the at least one of the plurality of centripetal cams pushing the trigger plate when the centripetal cam assembly moves to the extended position, and wherein rotating the trigger plate causes the switch to open.

18. The overspeed safety apparatus of claim 17, wherein the over-center spring is configured to retain the trigger plate in a first location while in the operational position, and to retain the trigger plate in a second location after being pushed to hold open the switch.

* * * * *